US012736202B2

(12) United States Patent
Itou

(10) Patent No.: US 12,736,202 B2
(45) Date of Patent: Sep. 15, 2026

(54) LIGHTING DEVICE

(71) Applicant: Japan Display Inc., Tokyo (JP)

(72) Inventor: Shouhei Itou, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 19/392,765

(22) Filed: Nov. 18, 2025

(65) Prior Publication Data

US 2026/0071735 A1 Mar. 12, 2026

Related U.S. Application Data

(63) Continuation of application No. PCT/JP2024/017590, filed on May 13, 2024.

(30) Foreign Application Priority Data

Jun. 6, 2023 (JP) ................................ 2023-093363

(51) Int. Cl.

| | |
|---|---|
| ***F21V 14/00*** | (2018.01) |
| ***F21L 4/04*** | (2006.01) |
| ***F21V 23/04*** | (2006.01) |
| ***G02F 1/133*** | (2006.01) |
| ***G02F 1/1335*** | (2006.01) |
| ***G02F 1/1343*** | (2006.01) |
| ***G02F 1/1347*** | (2006.01) |

(52) U.S. Cl.

CPC .............. *F21V 14/003* (2013.01); *F21L 4/04* (2013.01); *F21V 23/04* (2013.01); *G02F 1/13306* (2013.01); *G02F 1/133612* (2021.01); *G02F 1/134309* (2013.01); *G02F 1/1347* (2013.01)

(58) Field of Classification Search

CPC ............. G02B 3/14; G02F 1/294; G02F 1/29; G02F 1/13471; G02F 2203/01; G02F 2203/24; G02F 1/1335; G02F 1/133; G02F 1/1343; G02F 1/1347; F21V 14/00; F21V 23/04; F21L 4/04

See application file for complete search history.

(56) References Cited

U.S. PATENT DOCUMENTS

| | | | | |
|---|---|---|---|---|
| 6,219,113 | B1 * | 4/2001 | Takahara .......... | G02F 1/133526 345/98 |
| 2019/0221176 | A1 * | 7/2019 | Emslie ................ | G02F 1/13471 |
| 2019/0266970 | A1 * | 8/2019 | Newton .............. | G02F 1/13471 |
| 2022/0357614 | A1 | 11/2022 | Koito et al. | |

OTHER PUBLICATIONS

Search Report issued in related International Patent Application No. PCT/JP2024/017590 mailed on Jul. 23, 2024 and English translation of same. 6 pages.

* cited by examiner

*Primary Examiner* — William J Carter

(74) *Attorney, Agent, or Firm* — K&L Gates LLP

(57) ABSTRACT

A lighting device includes an optical element driving circuit portion and a first push switch connected to the optical element driving circuit portion. The optical element driving circuit portion generates a first signal having a first pulse wave and a second signal having a second pulse wave inverted in phase from the first pulse wave. Each time a push button of the first push switch is pressed, one of a plurality of input contacts is selected so as to be electrically connected to an output contact, and an amplitude of each of the first pulse wave and the second pulse wave is changed in a stepwise manner.

13 Claims, 16 Drawing Sheets

1

10

110-1
100-1
140
150
120-1
130-1
130-2
110-2
160
110-1
100-2
140
150
120-1
130-1
130-2
110-2
160
110-1
100-3
140
150
130-1
130-2
120-3
110-2
160
110-1
100-4
140
150
130-1
130-2
120-3
110-2

10

100-1
110-1
140
150
130-1
120-1
120-2
130-2
120-3
110-2
160
100-2
110-1
140
150
130-1
120-1
120-2
130-2
120-3
110-2
160
100-3
110-1
140
150
120-1
130-1
120-3
120-4
130-2
110-2
160
100-4
110-1
140
150
120-1
130-1
120-3
120-4
130-2
110-2

100

100

100-1
121-3
122-1
122-3
122-4
122-2
121-4
110-2
62out_1
62out_2
62
62in_1
62in_2
62in_3
62in_4
S1
PW1
S2
PW2
S5
$P_{fix}$
S3
PW1
S4
PW2

LIGHTING DEVICE

CROSS-REFERENCE TO RELATED APPLICATIONS

This application is a Continuation of International Patent Application No. PCT/JP2024/017590, filed on May 13, 2024, which claims the benefit of priority to Japanese Patent Application No. 2023-093363, filed on Jun. 6, 2023, the entire contents of which are incorporated herein by reference.

FIELD

An embodiment of the present invention relates to a lighting device using a liquid crystal to control a distribution of light emitted from a light source.

BACKGROUND

An optical element which is a so-called liquid crystal lens has been conventionally known in which a change in the refractive index of a liquid crystal is utilized by adjusting a voltage applied to the liquid crystal. Further, a lighting device including a light source and a liquid crystal lens has been developed (for example, see Japanese laid-open patent publication No. 2021-117344).

SUMMARY

A lighting device according to an embodiment of the present invention includes a light source, an optical element including a first liquid crystal cell and transmitting light emitted from the light source in a diffusible manner, an optical element driving circuit portion connected to the optical element and generating a signal for driving the optical element, and a first push switch including a push button operated by a user and connected to the optical element driving circuit portion. The first liquid crystal cell includes a first substrate on which a first transparent electrode and a second transparent electrode each extending in a first direction are alternatively arranged in a second direction orthogonal to the first direction, a second substrate on which a third transparent electrode and a fourth transparent electrode each extending in the second direction are alternately arranged in the first direction, and a liquid crystal layer between the first substrate and the second substrate. The optical element driving circuit portion includes a first resistive voltage divider circuit electrically connected to a plurality of input contacts of the first push switch, a first output terminal electrically connected to an output contact of the first push switch and outputting a first signal having a first pulse wave, and a second output terminal electrically connected the output contact of the first push switch and outputting a second signal having a second pulse wave with an inverted phase of the first pulse wave. The first signal is input to the optical element so that the first pulse wave is applied to the first transparent electrode. The second signal is input to the optical element so that the second pulse wave is applied to the second transparent electrode. Each time the push button of the first push switch is pressed, one of the plurality of input contacts is selected so as to be electrically connected to the output contact, and an amplitude of each of the first pulse wave and the second pulse wave is changed in a stepwise manner.

A lighting device according to an embodiment of the present invention includes a light source, an optical element including a first liquid crystal cell and transmitting light emitted from the light source in a diffusible manner, an optical element driving circuit portion connected to the optical element and generating a signal for driving the optical element, a first push switch including a first push button operated by a user and connected to the optical element driving circuit portion, and a second push switch including a second push button operated by the user. A first input contact, a second input contact, a third input contact, and a fourth input contact of the second push switch are electrically connected to the optical element driving circuit portion. A first output contact and a second output contact of the second push switch are electrically connected to the optical element. The first liquid crystal cell includes a first substrate on which a first transparent electrode and a second transparent electrode each extending in a first direction are alternatively arranged in a second direction orthogonal to the first direction, a second substrate on which a third transparent electrode and a fourth transparent electrode each extending in the second direction are alternately arranged in the first direction, and a liquid crystal layer between the first substrate and the second substrate. The optical element driving circuit portion generates a first signal having a first pulse wave, a second signal with an inverted phase of the first pulse wave, and a third signal having a fixed potential. The first signal and the second signal are input to the first input contact and the second input contact of the second push switch, respectively. The third signal is input to the third input contact and the fourth input contact of the second push switch. Each time the second push button of the second push switch is pressed, one of the first input contact and the second input contact is selected so as to be electrically connected to the first output contact and one of the third input contact and the fourth input contact is selected so as to be electrically connected to the second output contact. The first pulse wave and the second pulse wave are applied to the first transparent electrode and the second transparent electrode, respectively, or the fixed potential is applied to the first transparent electrode and the second transparent electrode.

DESCRIPTION OF EMBODIMENTS

Figure 1A:
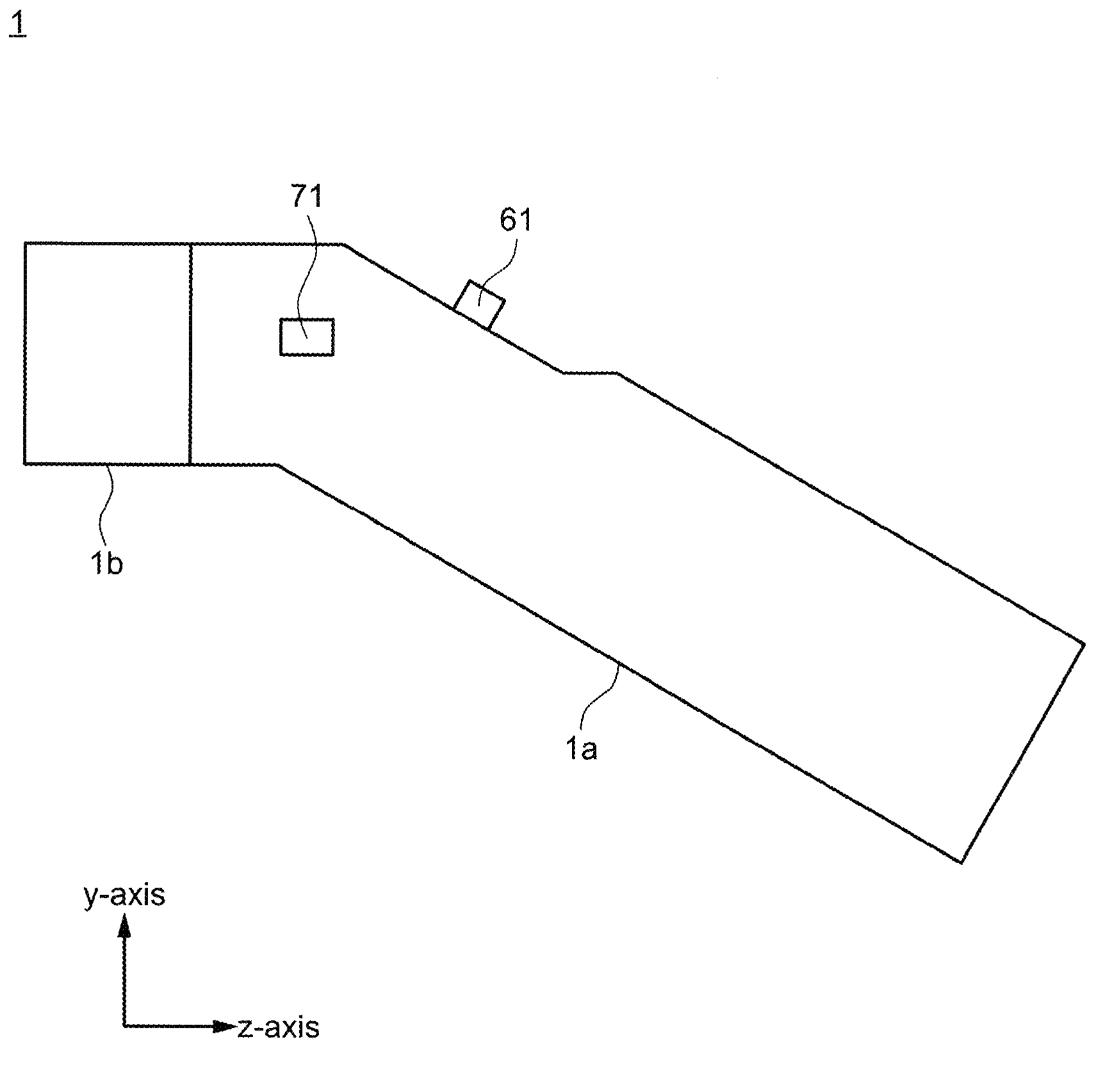
FIG. 1A is a schematic side view showing a configuration of a lighting device according to an embodiment of the present invention.

In a lighting device including an optical element such as a liquid crystal lens, the spread of light irradiated from the lighting device, i.e., the light distribution angle, can be adjusted by the optical element. Such a lighting device is used not only by being installed in a predetermined location, but also by being carried by a user. When the user uses the lighting device while holding it, it is preferable that the light distribution angle can be easily adjusted while the user holds the lighting device.

An embodiment of the present invention can provide a lighting device that can easily adjust a light distribution angle. Further, an embodiment of the present invention can provide a lighting device that can easily adjust a light distribution shape.

In the following description, each of the embodiments of the present invention is described with reference to the drawings. However, the present invention can be implemented in various modes without departing from the gist of the invention and should not be interpreted as being limited to the description of the embodiments exemplified below.

Although the drawings may be schematically represented in terms of width, thickness, shape, and the like of each part as compared with their actual mode in order to make explanation clearer, they are only an example and an interpretation of the present invention is not limited. In addition, in the drawings, the same reference numerals are provided to the same elements as those described previously with reference to preceding figures and repeated explanations may be omitted accordingly.

In the case when a single film is processed to form a plurality of structural bodies, each structural body may have different functions and roles, and the bases formed beneath each structural body may also be different. However, the plurality of structural bodies is derived from films formed in the same layer by the same process and have the same material. Therefore, the plurality of these films is defined as existing in the same layer.

When expressing a mode in which another structure is arranged over a certain structure, in the case where it is simply described as "over", unless otherwise noted, a case where another structure is arranged directly over a certain structure as if in contact with that structure, and a case where another structure is arranged via yet another structure over a certain structure, are both included.

First Embodiment

A lighting device 1 according to an embodiment of the present invention is described with reference to FIGS. 1A to 7.

[1. Configuration of Lighting Device 1]

Figure 1B:
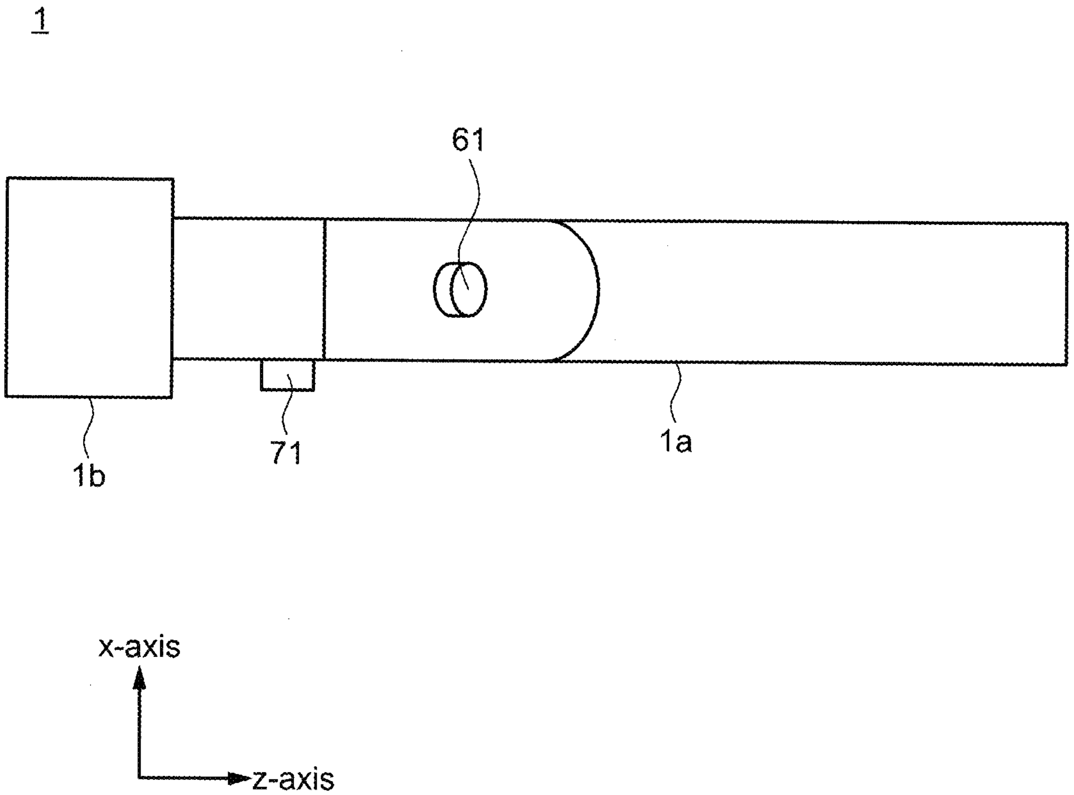
FIG. 1B is a schematic top view showing a configuration of a lighting device according to an embodiment of the present invention.

FIGS. 1A and 1B are a schematic side view and a schematic top view, respectively, showing a configuration of the lighting device 1 according to an embodiment of the present invention.

As shown in FIGS. 1A and 1B, the lighting device 1 includes a body unit 1*a* and a lighting unit 1*b*. The lighting unit 1*b* is connected to an end of the body unit 1*a*. The body unit 1*a* has a cylindrical shape, and light is irradiated from the lighting unit 1*b*. A user can hold the body unit 1*a* and illuminate their surroundings with the light irradiated from the lighting unit 1*b*. Thus, the lighting device 1 can be used as a flashlight. However, the usage of the lighting device 1 is not limited thereto. The lighting device 1 can also be used as a spotlight.

Hereinafter, for convenience of explanation, a direction in which the body unit 1*a* extends is referred to as a z-axis direction when seen from the top view. That is, the irradiation direction of light irradiated from the lighting unit 1*b* is the z-axis direction. Further, a direction perpendicular to the z-axis direction when seen from the top view is referred to as an x-axis direction. That is, the diffusion direction of light irradiated from the lighting unit 1*b* is the x-axis direction. Furthermore, a direction perpendicular to the z-axis direction and the x-axis direction is referred to as a y-axis direction.

In the side view, the body unit 1*a* has a curved shape. Specifically, the body unit 1*a* extends parallel to the z-axis direction and has a shape in which a portion parallel to the z-axis direction connected to the lighting unit 1*b* is combined with a portion extending in a direction not parallel to the z-axis direction. When the body unit 1*a* has this shape, the user can hold the body unit 1*a* without applying excessive force to the user's wrist and illuminate the user's surroundings even when the user uses the lighting device 1 near the user's face. However, the shape of the body unit 1*a* is not limited thereto. The shape of the body unit 1*a* can be a shape depending on the usage aspect of the lighting device 1.

A push button of a push switch 61 is provided on the top surface of the body unit 1*a*. The push switch 61 adjusts the light distribution angle of the light irradiated from the lighting unit 1*b*. That is, when the user presses the push button of the push switch 61, the light distribution angle of the light irradiated from the lighting unit 1*b* changes in a stepwise manner. Further, the body unit 1*a* includes a light source adjustment switch 71 that adjusts a brightness of the light irradiated from the lighting unit 1*b*. When the light source adjustment switch 71 is a slide switch, a knob for the slide switch may be provided on the side of the main body 1*a*. Further, when the light source adjustment switch 71 is a push switch, a push button for the push switch may be provided on the side of the main body 1*a*. When the light source adjustment switch 71 is a slide switch, the brightness of the light irradiated from the lighting unit 1*b* can be continuously adjusted by sliding the slide knob. On the other hand, when the light source adjustment switch 71 is a push switch, the brightness of the light irradiated from the lighting unit 1*b* can be adjusted in a stepwise manner by pressing the push button of the push switch.

Figure 1C:
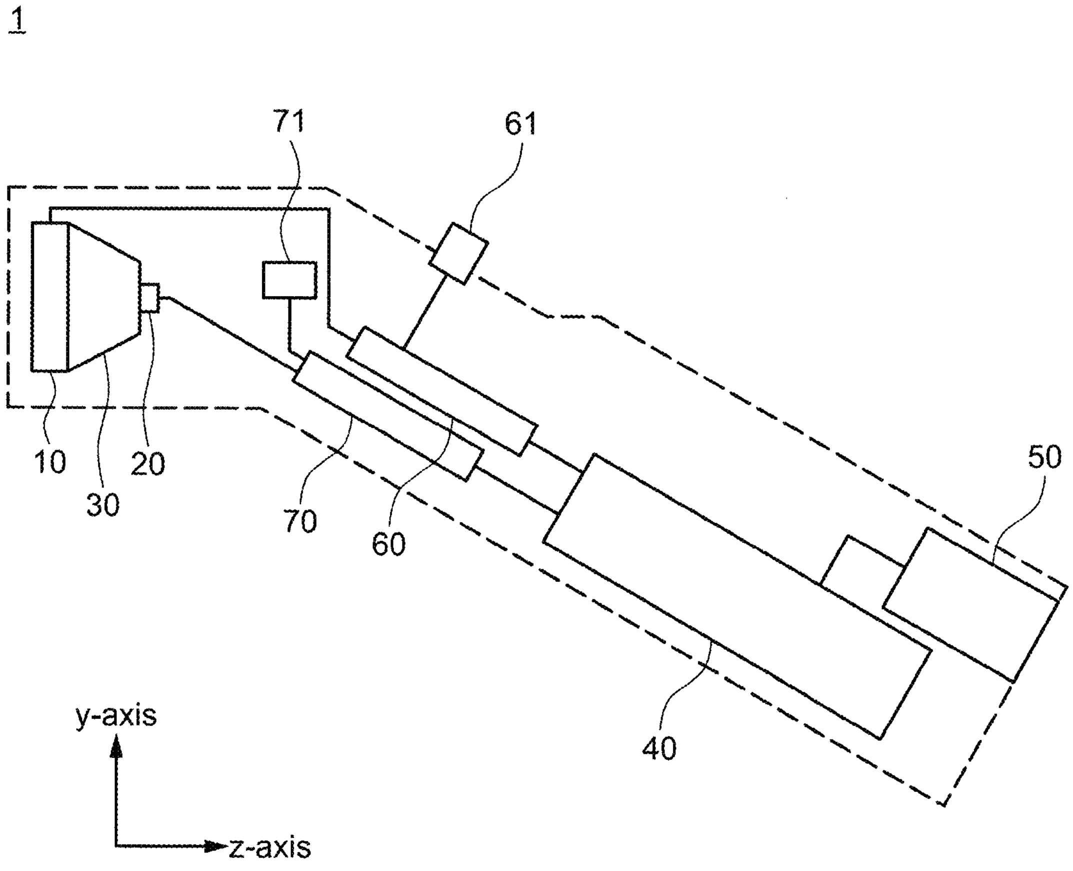
FIG. 1C is a schematic block diagram showing an internal configuration of a lighting device according to an embodiment of the present invention.

FIG. 1C is a schematic block diagram showing an internal configuration of the lighting device 1 according to an embodiment of the present invention.

As shown in FIG. 1C, the lighting device 1 includes an optical element 10, a light source 20, an optical adjustment portion 30, a battery 40, a charging module 50, an optical element drive circuit portion 60, and a light source drive circuit portion 70. The optical element 10, the light source 20, and the optical adjustment portion 30 are housed in the lighting unit 1*b*. The battery 40, the charging module 50, the optical element drive circuit portion 60, and the light source drive circuit portion 70 are housed in the body unit 1*a*.

FIG. 1C shows the connection relationships of the components. The optical element driving circuit portion 60 is connected to the optical element 10 and the battery 40. The optical element driving circuit portion 60 receives power from the battery 40 and generates signals to drive the optical element 10. Further, the optical element driving circuit portion 60 is connected to the push switch 61. The light source driving circuit portion 70 is connected to the light source 20 and the battery 40. The light source driving circuit portion 70 receives power from the battery 40 and generates signals to drive the light source 20. Further, the light source driving circuit portion 70 is connected to the light source adjustment switch 71.

The battery 40 is connected to the charging module 50. The battery 40 may be a so-called secondary battery (e.g., a lithium-ion battery) that can be repeatedly used by charging. The battery 40 can be charged via the charging module 50. The charging module 50 controls the charging of the battery 40 while preventing overcharging of the battery 40. The battery 40 may be charged either in a wired configuration or a wireless configuration. In a wired configuration, the charging module 50 is provided with a terminal for connecting a power cable, and power is charged to the battery 40 via the power cable connected to the terminal of the charging module 50. In a wireless configuration, a power receiving coil is provided in the charging module 50, and power converted by the power receiving coil is charged to the battery 40. In addition, the lighting device 1 may also be configured without the charging module 50. In this case, the battery 40 may be a so-called primary battery (e.g., an alkaline battery or a manganese battery) that cannot be recharged.

The light source 20 emits light to the optical element 10. For example, a light emitting diode (LED) can be used as the light source 20. A plurality of LEDs may be used as the light source 20. When a plurality of LEDs is used as the light source 20, LEDs of the same color may be used, or LEDs of different colors may be used. In addition, the light source 20 is not limited to an LED. The light source 20 may be any element or device that can emit light.

The optical adjusting portion 30 is disposed between the optical element 10 and the light source 20, and converges, diffuses, or reflects the light emitted from the light source 20. For example, the optical adjusting portion 30 is an optical member such as a lens or a reflector, or an optical member in combination thereof.

[2. Configuration of Optical Element 10]

Here, a configuration of the optical element 10 is described with reference to FIGS. 2A to 4B.

[2-1. Structure of Optical Element 10]

Figure 2A:
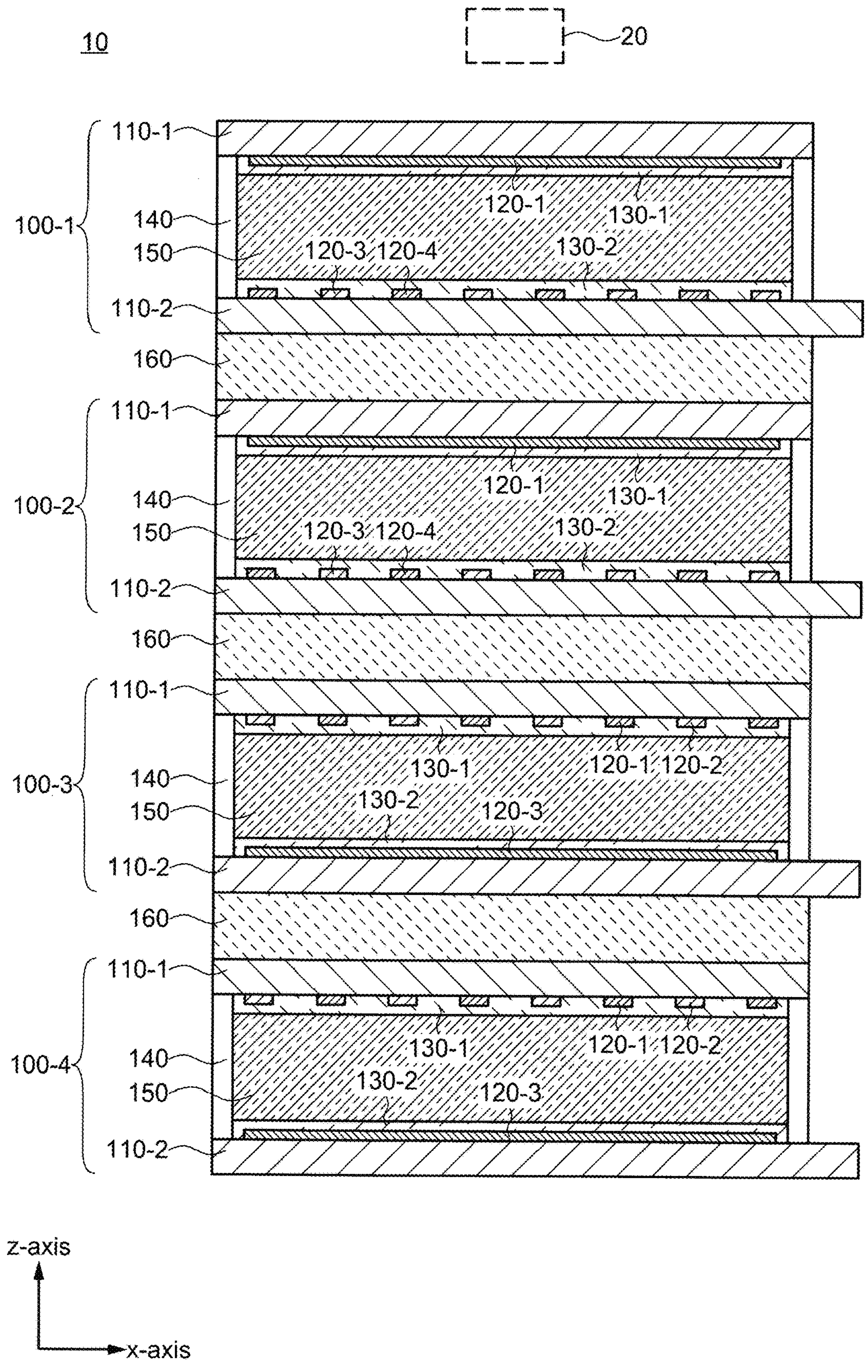
FIG. 2A is a schematic cross-sectional view showing a configuration of an optical element of a lighting device according to an embodiment of the present invention.
Figure 2B:
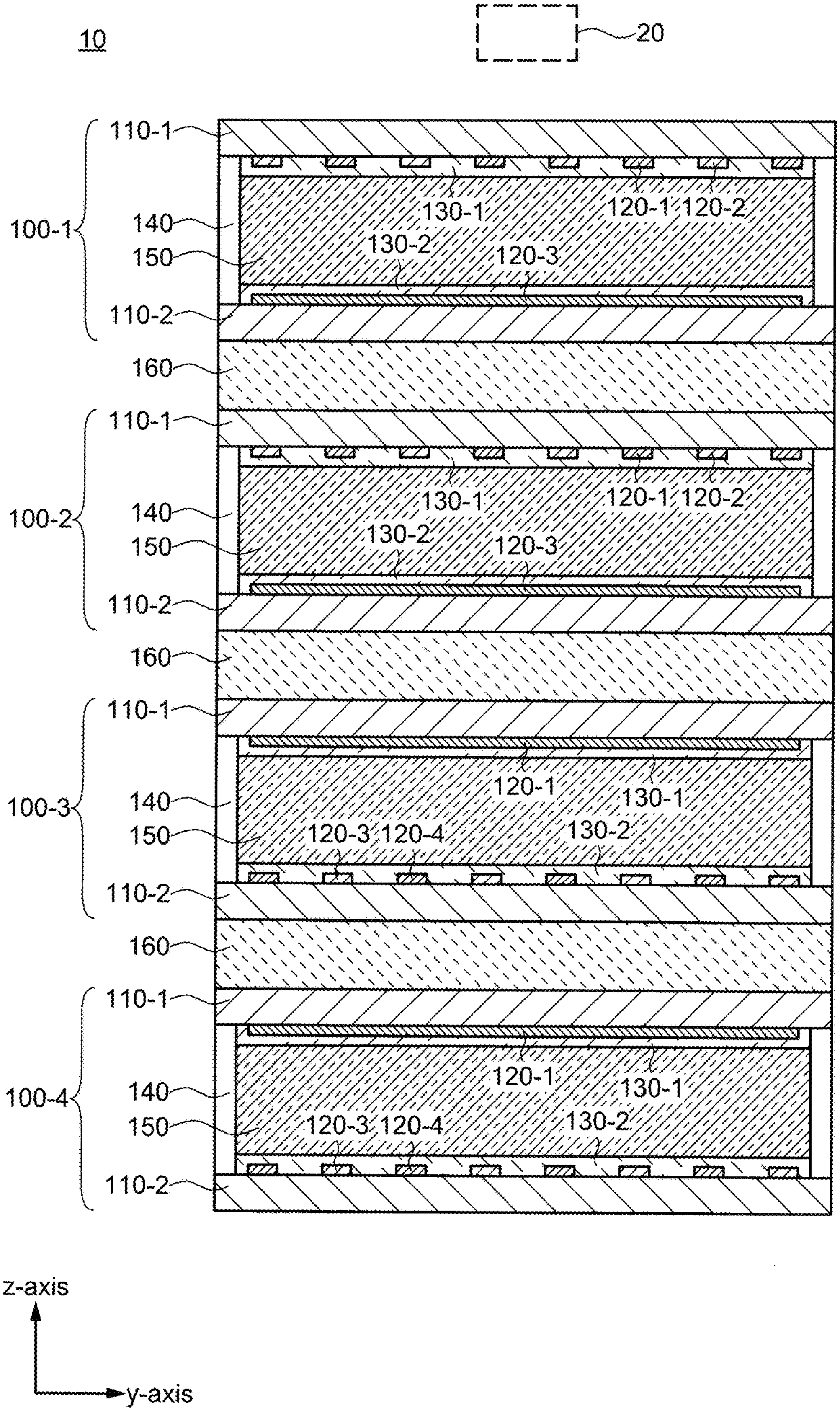
FIG. 2B is a schematic cross-sectional view showing a configuration of an optical element of a lighting device according to an embodiment of the present invention.

FIGS. 2A and 2B are schematic cross-sectional views showing a configuration of the optical element 10 of the lighting device 1 according to an embodiment of the present invention. FIG. 2A is a cross-sectional view of the optical element 10 taken along a plane perpendicular to the y-axis direction, and FIG. 2B is a cross-sectional view of the optical element 10 taken along a plane perpendicular to the x-axis direction.

The optical element 10 includes four liquid crystal cells 100 (a first liquid crystal cell 100-1, a second liquid crystal cell 100-2, a third liquid crystal cell 100-3, and a fourth liquid crystal cell 100-4). In the optical element 10, the first liquid crystal cell 100-1, the second liquid crystal cell 100-2, the third liquid crystal cell 100-3, and the fourth liquid crystal cell 100-4 are stacked in this order from the side closest to the light source 20 in the z-axis direction. Light emitted from the light source 20 is incident on the first liquid crystal cell 100-1 and is emitted from the fourth liquid crystal cell 100-4. In the lighting device 1, the four liquid crystal cells 100 included in the optical element 10 control the diffusion and the polarization of light, thereby changing the light distribution of the light emitted from the fourth liquid crystal cell 100-4. In other words, the optical element 10 transmits light emitted from the light source 20 in a diffusible manner and can control the light distribution.

Although FIGS. 2A and 2B show the configuration of the optical element 10 including four liquid crystal cells 100, the number of liquid crystal cells 100 included in the optical element 10 is not limited to four. The optical element 10 includes at least one liquid crystal cell 100.

As shown in FIGS. 2A and 2B, each of the first liquid crystal cell 100-1 to the fourth liquid crystal cell 100-4 includes a first substrate 110-1, a second substrate 110-2, a plurality of first transparent electrodes 120-1, a plurality of second transparent electrodes 120-2, a plurality of third transparent electrodes 120-3, a plurality of fourth transparent electrodes 120-4, a first alignment film 130-1, a second alignment film 130-2, a sealant 140, and a liquid crystal layer 150. The first transparent electrodes 120-1 and the second transparent electrodes 120-2 are alternately provided on the first substrate 110-1. Further, the first alignment film 130-1 is provided on the first substrate 110-1 so as to cover the first transparent electrodes 120-1 and the second transparent electrodes 120-2. The third transparent electrodes 120-3 and the fourth transparent electrode 120-4 are alternately provided on the second substrate 110-2. Further, the second alignment film 130-2 is provided on the second substrate 110-2 so as to cover the third transparent electrodes 120-3 and the fourth transparent electrodes 120-4. The first substrate 110-1 and the second substrate 110-2 are disposed so that the first transparent electrodes 120-1 and the second transparent electrodes 120-2 face the third transparent electrodes 120-3 and the fourth transparent electrodes 120-4, and are bonded via a sealing member 140 provided on the periphery of the first substrate 110-1 and the second substrate 110-2. A liquid crystal is sealed in a space surrounded by the first substrate 110-1 (more specifically, the first alignment film 130-1), the second substrate 110-2 (more specifically, the second alignment film 130-2), and the sealing member 140, and the liquid crystal layer 150 is provided between the first substrate 110-1 and the second substrate 110-2.

An optical elastic resin layer 160 is provided between the first liquid crystal cell 100-1 and the second liquid crystal cell 100-2. Similarly, optical elastic resin layers 160 are provided between the second liquid crystal cell 100-2 and the third liquid crystal cell 100-3, and between the third liquid crystal cell 100-3 and the fourth liquid crystal cell 100-4. For example, an adhesive containing a light-transmitting acrylic resin can be used for the optical elastic resin layer 160. That is, the optical elastic resin layer 160 can bond and fix two adjacent liquid crystal cells 100 together.

For example, a rigid substrate having light-transmitting properties such as a glass substrate, a quartz substrate, or a sapphire substrate is used as each of the first substrate 110-1 and the second substrate 110-2. Further, a flexible substrate having light-transmitting properties such as a polyimide resin substrate, an acrylic resin substrate, a siloxane resin substrate, or a fluorine resin substrate can also be used as each of the first substrate 110-1 and the second substrate 110-2.

Each of the first transparent electrode 120-1, the second transparent electrode 120-2, the third transparent electrode 120-3, and the fourth transparent electrode 120-4 functions as an electrode for forming an electric field in the liquid crystal layer 150. For example, a transparent conductive material such as indium tin oxide (ITO) or indium zinc oxide (IZO) is used for each of the first transparent electrode 120-1, the second transparent electrode 120-2, the third transparent electrode 120-3, and the fourth transparent electrode 120-4.

In the first liquid crystal cell 100-1 and the second liquid crystal cell 100-2, the first transparent electrode 120-1 and the second transparent electrode 120-2 extend in the x-axis direction, and the third transparent electrode 120-3 and the fourth transparent electrode 120-4 extend in the y-axis direction. In the third liquid crystal cell 100-3 and the fourth liquid crystal cell 100-4, the first transparent electrode 120-1 and the second transparent electrode 120-2 extend in the y-axis direction, and the third transparent electrode 120-3 and the fourth transparent electrode 120-4 extend in the x-axis direction.

In addition, when the first transparent electrode 120-1 to the fourth transparent electrode 120-4 are not particularly distinguished from each other, they may be referred as a transparent electrode 120 in the following description.

Each of the first alignment film 130-1 and the second alignment film 130-2 aligns the liquid crystal molecules in the liquid crystal layer 150 in a predetermined direction. For example, a polyimide resin or the like can be used for each of the first alignment film 130-1 and the second alignment film 130-2. In addition, each of the first alignment film 130-1 and the second alignment film 130-2 may be imparted with alignment properties by an alignment treatment such as a rubbing method or a photo-alignment method. The rubbing method is a method of rubbing the surface of the alignment film in one direction. The photo-alignment method is a method of irradiating an alignment film with linearly polarized ultraviolet rays.

An alignment treatment is performed on the first alignment film 130-1 so that the liquid crystal molecules on the first substrate 110-1 side of the liquid crystal layer 150 are aligned in a direction perpendicular to the extending direction of the first transparent electrode 120-1 and the second transparent electrode 120-2. An alignment treatment is performed on the second alignment film 130-2 so that the liquid crystal molecules on the second substrate 110-2 side of the liquid crystal layer 150 are aligned in a direction perpendicular to the extending direction of the third transparent electrode 120-3 and the fourth transparent electrode 120-4. Therefore, in the first liquid crystal cell 100-1 and the second liquid crystal cell 100-2, the long axes of the liquid crystal molecules on the side of the first substrate 110-1 are aligned in the y-axis direction, and the long axes of the liquid crystal molecules on the side of the second substrate 110-2 are aligned in the x-axis direction. Further, in the third liquid crystal cell 100-3 and the fourth liquid crystal cell 100-4, the long axes of the liquid crystal molecules on the side of the first substrate 110-1 are aligned in the x-axis direction, and the long axes of the liquid crystal molecules on the side of the second substrate 110-2 are aligned in the y-axis direction.

An adhesive material containing epoxy resin or acrylic resin is used for the sealing member 140. The adhesive material may be an ultraviolet curing type or a heat curing type.

The liquid crystal layer 150 can refract transmitted light or change the polarization state of transmitted light in accordance with the alignment state of the liquid crystal molecules. For example, nematic liquid crystal can be used as the liquid crystal of the liquid crystal layer 150. Although a positive liquid crystal is described as the liquid crystal in the present embodiment, a negative liquid crystal can also be adopted by changing the initial alignment directions of the liquid crystal molecules. Further, the liquid crystal preferably contains a chiral agent that imparts twist to the liquid crystal molecules.

[2-2. Electrode Pattern of Liquid Crystal Cell 100]

Figure 4A:
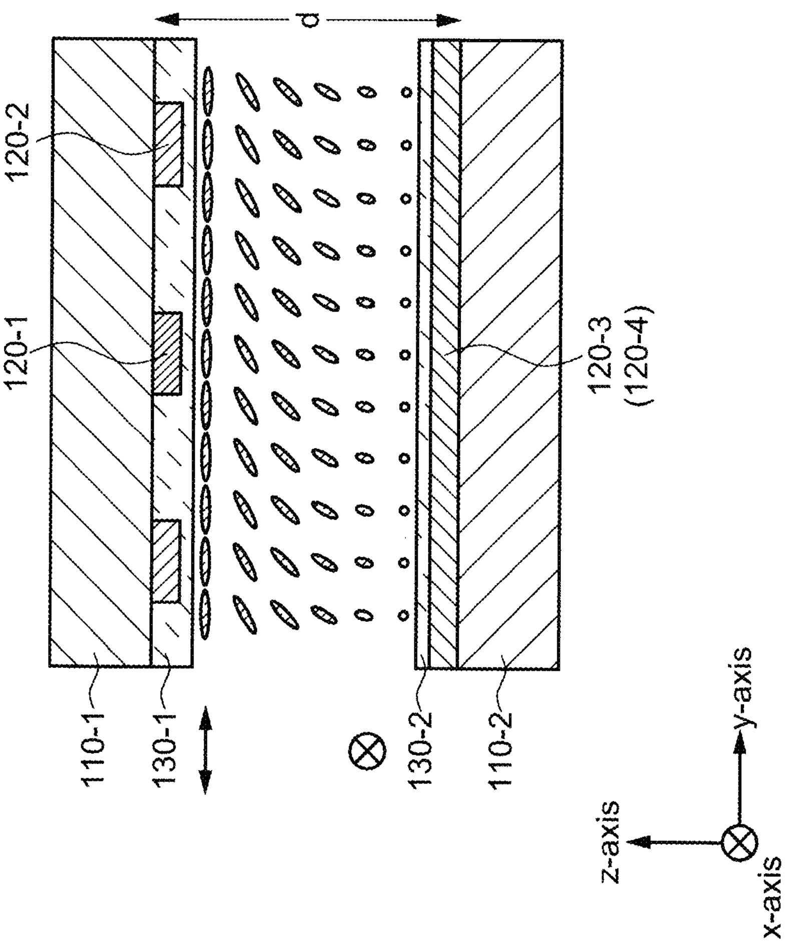
FIG. 4A is a schematic diagram illustrating optical characteristics of a liquid crystal cell in an optical element of a lighting device according to an embodiment of the present invention.
Figure 4B:
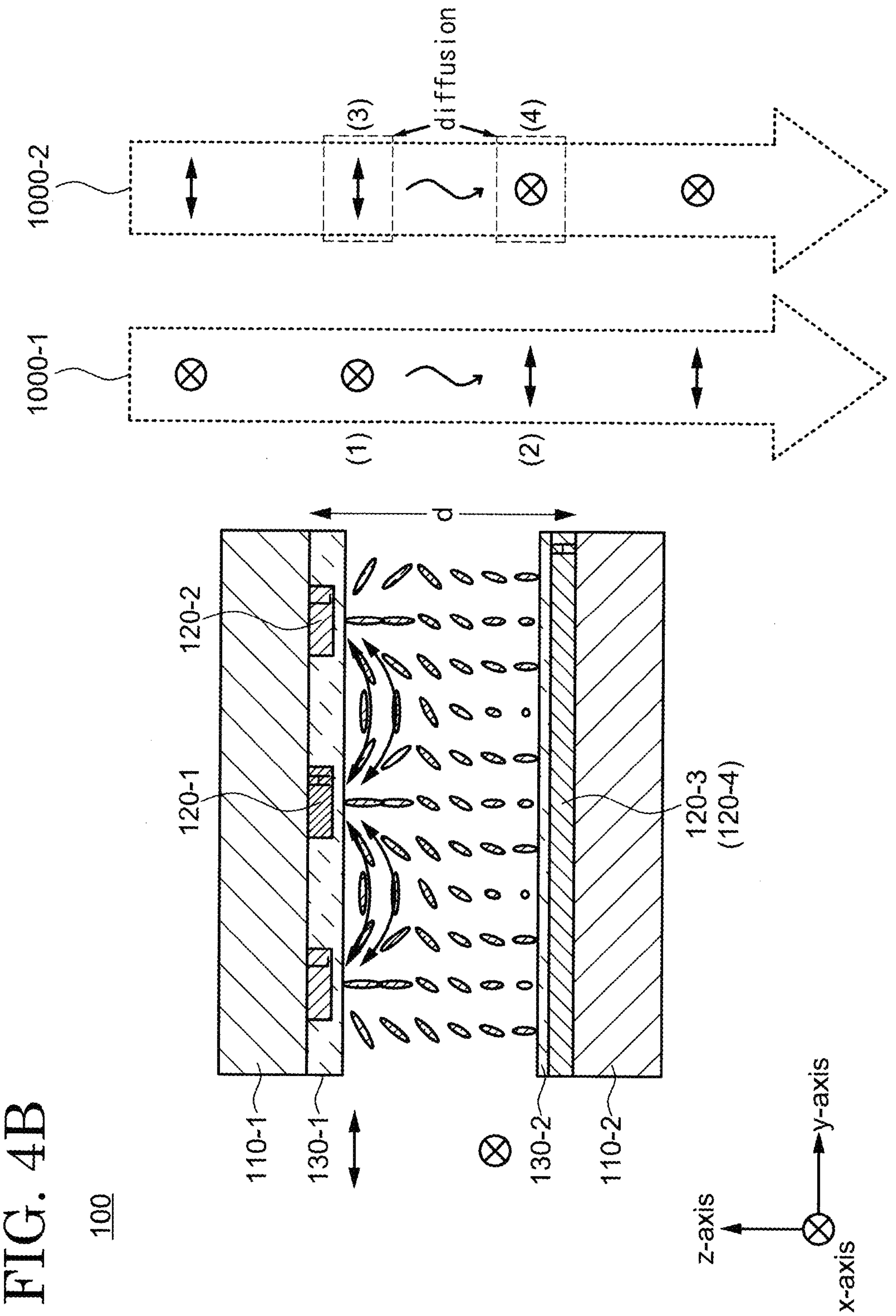
FIG. 4B is a schematic diagram illustrating optical characteristics of a liquid crystal cell in an optical element of a lighting device according to an embodiment of the present invention.

Each of FIGS. 4A and 4B is a schematic plan view showing an electrode pattern of the liquid crystal cell 100 included in the optical element 10 of the illumination device 1 according to an embodiment of the present invention. Specifically, FIG. 4A is a plan view showing an electrode pattern formed on the first substrate 110-1 of the first liquid crystal cell 100-1, and FIG. 4B is a plan view showing an electrode pattern formed on the second substrate 110-2 of the first liquid crystal cell 100-1.

Figure 3A:
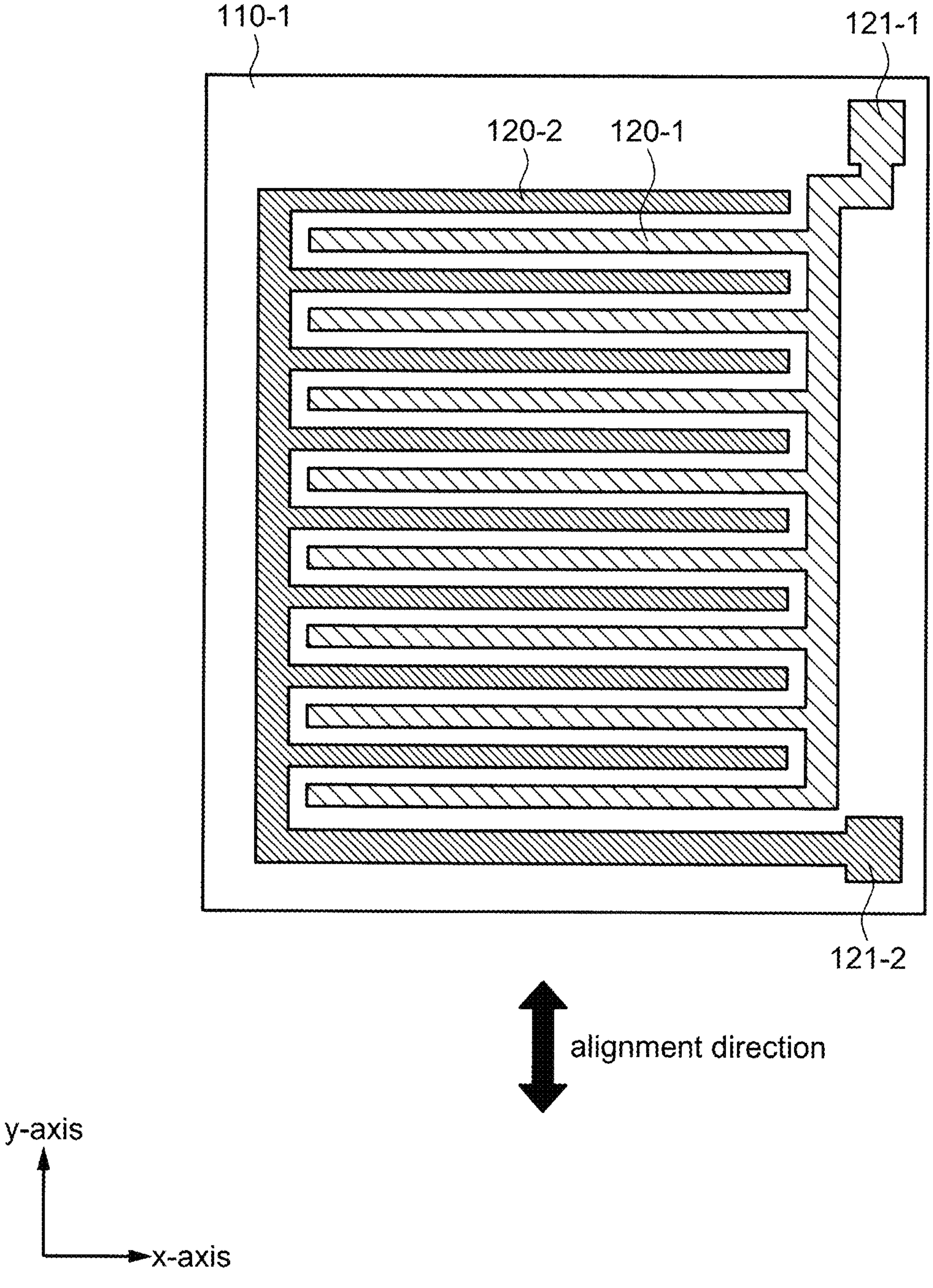
FIG. 3A is a schematic plan view showing an electrode pattern of a liquid crystal cell included in an optical element of a lighting device according to an embodiment of the present invention.

As shown in FIG. 3A, a first connection pad 121-1 and a second connection pad 121-2 are provided on the first substrate 110-1. The plurality of first transparent electrodes 120-1 are electrically connected to the first connection pad 121-1. The plurality of second transparent electrodes 120-2 are electrically connected to the second connection pad 121-2. As described above, the first alignment film 130-1 (not shown in FIG. 3A) is provided on the plurality of first transparent electrodes 120-1 and the plurality of second transparent electrodes 120-2. An alignment treatment is performed on the first alignment film 130-1, and the alignment direction of the first alignment film 130-1 is the y-axis direction.

Figure 3B:
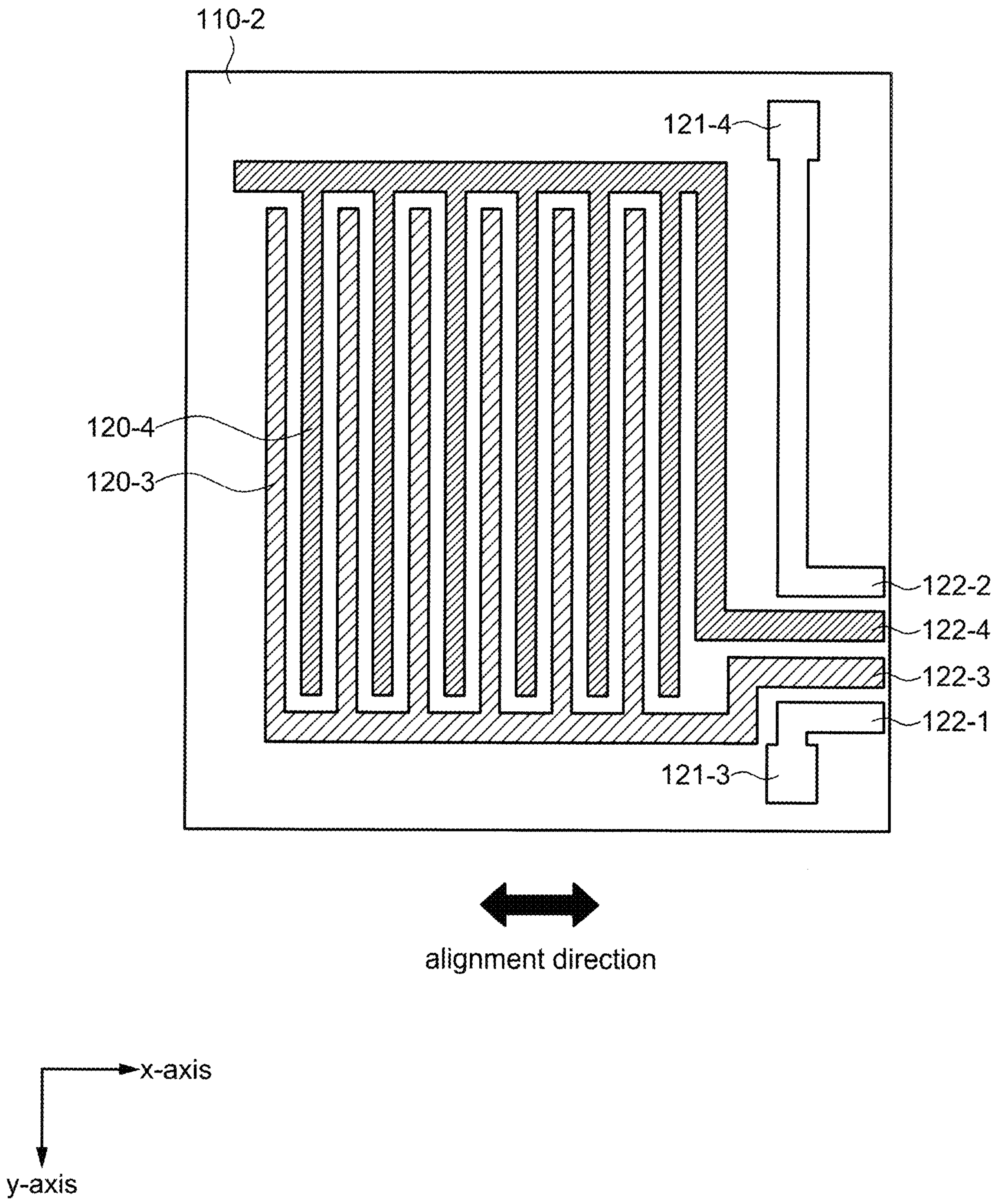
FIG. 3B is a schematic plan view showing an electrode pattern of a liquid crystal cell included in an optical element of a lighting device according to an embodiment of the present invention.

As shown in FIG. 3B, a third connection pad 121-3, a fourth connection pad 121-4, a first terminal 122-1, a second terminal 122-2, a third terminal 122-3, and a fourth terminal 122-4 are provided on the second substrate 110-2. The third transparent electrodes 120-3 are electrically connected to the third terminal 122-3. The fourth transparent electrodes 120-4 are electrically connected to the fourth terminal 122-4. The third connection pad 121-3 is electrically connected to the first terminal 122-1. The fourth connection pad 121-4 is electrically connected to the second terminal 122-2. As described above, the second alignment film 130-2 (not shown in FIG. 3B) is provided on the plurality of third transparent electrodes 120-3 and the plurality of fourth transparent electrodes 120-4. An alignment treatment is performed on the second alignment film 130-2, and the alignment direction of the first alignment film 130-2 is the x-axis direction.

When the first substrate 110-1 and the second substrate 110-2 are bonded to each other, the first connection pad 121-1 and the second connection pad 121-2 overlap the third connection pad 121-3 and the fourth connection pad 121-4, respectively. Since a conductive electrode is provided between the first connection pad 121-1 and the third connection pad 121-3, the first connection pad 121-1 and the third connection pad 121-3 are electrically connected via the conductive electrode. Similarly, since a conductive electrode is provided between the second connection pad 121-2 and the fourth connection pad 121-4, the second connection pad 121-2 and the fourth connection pad 121-4 are electrically connected via the conductive electrode. Therefore, the first transparent electrode 120-1 and the second transparent electrode 120-2 on the first substrate 110-1 are electrically connected to the first terminal 122-1 and the second terminal 122-2, respectively.

The electrode pattern of the second liquid crystal cell 100-2 is the same as that of the first liquid crystal cell 100-1. The configurations of the electrode patterns of the third liquid crystal cell 100-3 and the fourth liquid crystal cell 100-4 are similar to that of the first liquid crystal cell 100-1, except that the extending direction of the transparent electrode 120 differs by 90 degrees.

In the liquid crystal cell 100, the first terminal 122-1 to the fourth terminal 122-4 on the second substrate 110-2 are exposed from the first substrate 110-1. In each of the first liquid crystal cell 100-1 to the fourth liquid crystal cell 100-4, the exposed first terminal 122-1 to the fourth terminal 122-4 are electrically connected to the optical element driving circuit portion 60. Although details are described later, a predetermined potential is applied to each of the first transparent electrode 120-1 to the fourth transparent electrode 120-4 of each of the first liquid crystal cell 100-1 to the fourth liquid crystal cell 100-4 when signals generated in the optical element driving circuit portion 60 are input to the first terminal 122-1 to the fourth terminal 122-4 of each of the first liquid crystal cell 100-1 to the fourth liquid crystal cell 100-4. Thus, since the alignment state of the liquid crystal molecules in the liquid crystal layer 150 of each of the first liquid crystal cell 100-1 to the fourth liquid crystal cell 100-4 is changed, the distribution of light passing through the optical element 10 can be changed.

[2-3. Optical Characteristics of Liquid Crystal Cell 100]

Each of FIGS. 4A and 4B is a schematic diagram illustrating optical characteristics of the liquid crystal cell 100 included in the optical element 10 of the illumination device 1 according to an embodiment of the present invention. Specifically, FIG. 4A shows the liquid crystal cell 100 in a state where no voltage is applied to the transparent electrodes 120, and FIG. 4B shows the liquid crystal cell 100 in a state where voltages are applied to the transparent electrodes 120.

As shown in FIG. 4A, the liquid crystal molecules on the first substrate 110-1 side of the liquid crystal layer 150 are aligned in the y-axis direction, and the liquid crystal molecules on the second substrate 110-2 side of the liquid crystal layer 150 are aligned in the x-axis direction. Therefore, when no voltage is applied to any of the first transparent electrode 120-1 to the fourth transparent electrode 120-4, the liquid crystal molecules in the liquid crystal layer 150 are aligned so as to be twisted 90 degrees as they move from the first substrate 110-1 to the second substrate 110-2. Further, the polarization plane (the direction of the polarization axis or the polarization component) of the light passing through the liquid crystal layer 150 is rotated 90 degrees according to the alignment directions of the liquid crystal molecules. That is, the light passing through the liquid crystal layer 150 (more specifically, the polarization component of the light passing through the liquid crystal layer 150) has optical rotation.

On the other hand, when voltages are applied so that a potential difference is generated between two adjacent transparent electrodes 120, an electric field (hereinafter referred to as a "lateral electric field") is generated between the two adjacent transparent electrodes 120, and the alignment state of the liquid crystal molecules changes. As shown in FIG. 4B, the liquid crystal molecules in the liquid crystal layer 150 are aligned so as to be twisted 90 degrees from the first substrate 110-1 to the second substrate 110-2, while the liquid crystal molecules closer to the first substrate 110-1 are aligned in a convex arc shape with respect to the first substrate 110-1 by the lateral electric field between the first transparent electrode 120-1 and the second transparent electrode 120-2, and the liquid crystal molecules closer to the second substrate 110-2 are aligned in a convex arc shape with respect to the second substrate 110-2 by the lateral electric field between the third transparent electrode 120-3 and the fourth transparent electrode 120-4. The liquid crystal molecules aligned in the convex arc shape have a refractive index distribution, and the polarization component of light along the alignment direction of the liquid crystal molecules is diffused. In addition, since the cell gap d, which is the distance between the first substrate 110-1 and the second substrate 110-2, is sufficiently larger than the distance between two adjacent transparent electrodes (for example, 10 μm≤d≤30 μm, preferably 10 μm≤d≤30 μm, and more preferably 15 μm≤d≤25 μm), the electric field formed between the transparent electrodes 120 does not have much effect on the liquid crystal molecules located in the vicinity of the center between the first substrate 110-1 and the second substrate 110-2.

The light emitted from the light source 20 includes a polarization component in the x-axis direction (hereinafter, referred to as a "P-polarization component") and a polarization component in the y-axis direction (hereinafter, referred to as an "S polarization component"). However, in the following description, it is described that the light incident on the liquid crystal cell 100 is divided into a first light 1000-1 having the P-polarization component and a second light 1000-2 having the S-polarization component, for convenience.

Since the polarization direction of the P-polarized component of the first light 1000-1 incident on the first substrate 110-1 is different from the alignment direction of the liquid crystal molecules on the side of the first substrate 110-1, the first light 1000-1 is not diffused (see (1) in FIG. 4B). Further, the first light 1000-1 is rotated while passing through the liquid crystal layer 150, and the polarization component changes from the P-polarization component to the S-polarization component. Since the polarization direction of the S-polarization component of the first light 1000-1 is different from the alignment direction of the liquid crystal molecules on the side of the second substrate 110-2, the first light 1000-1 is not diffused (see (2) in FIG. 4B).

Since the polarization direction of the S-polarization component of the second light 1000-2 incident on the first substrate 110-1 is the same as the alignment direction of the liquid crystal molecules on the side of the first substrate 110-1, the second light 1000-2 is diffused in the y-axis direction in accordance with the refractive index distribution of the liquid crystal molecules (see (3) in FIG. 4B). Further, the second light 1000-2 is rotated while passing through the liquid crystal layer 150, and the polarization component changes from the S-polarization component to the P-polarization component. Since the polarization direction of the P-polarization component of the second light 1000-2 is the same as the alignment direction of the liquid crystal molecules on the side of the second substrate 110-2, the second light 1000-2 is diffused in the x-axis direction in accordance with the refractive index distribution of the liquid crystal molecules (see (4) in FIG. 4B).

Although the above description is of the configuration of one liquid crystal cell 100, in an optical element 10 including multiple liquid crystal cells 100, each of the plurality of liquid crystal cells 100 controls the P-polarization component or the S-polarization component of the light incident on the optical element 10 including the plurality of liquid crystal cells 100.

[3. Configuration of Optical Element Driving Circuit Portion 60]

Figure 5:
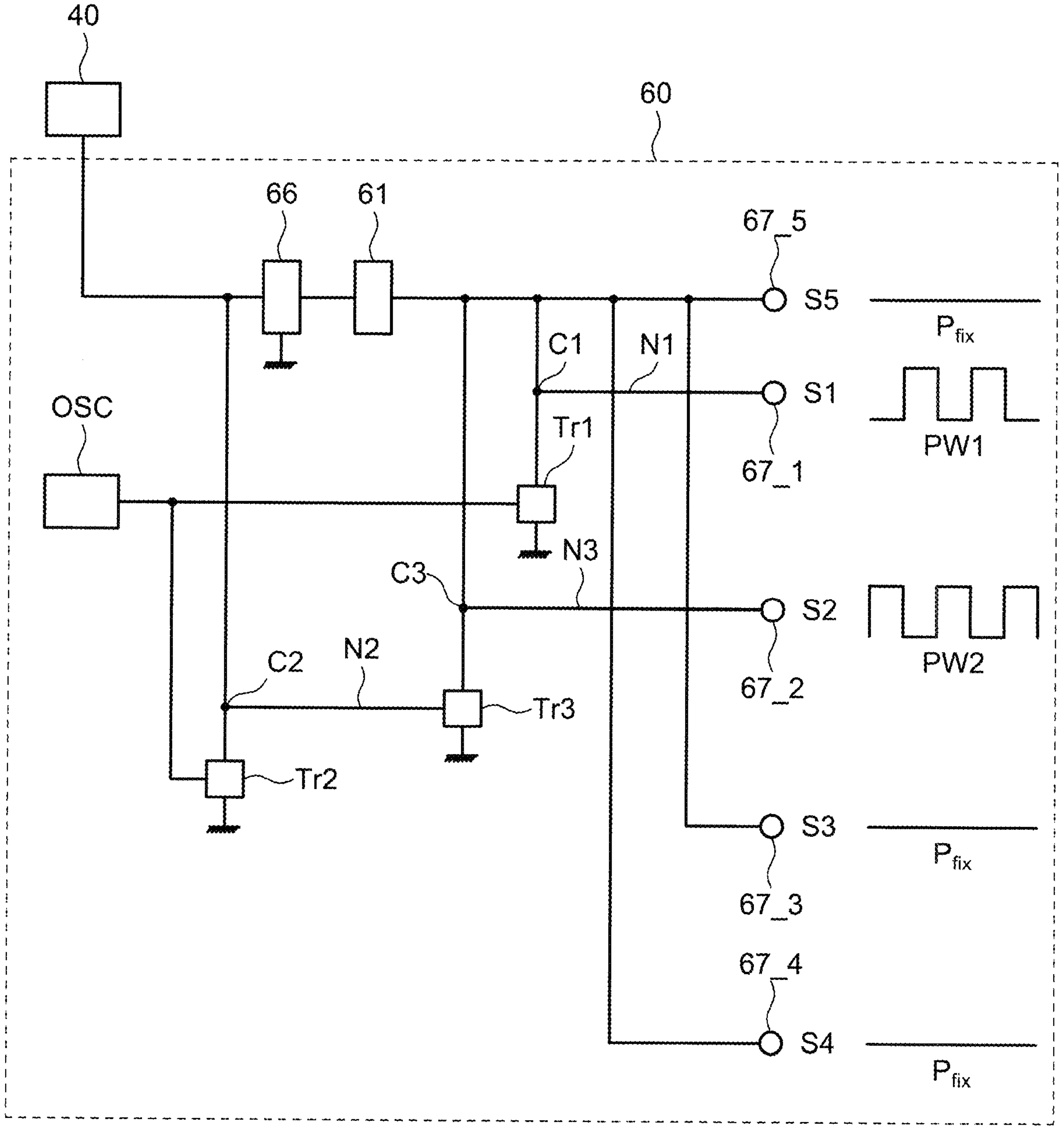
FIG. 5 is a block diagram showing a circuit configuration of an optical element driving circuit portion of a lighting device according to an embodiment of the present invention.

FIG. 5 is a block diagram showing a circuit configuration of the optical element driving circuit portion 60 of the lighting device 1 according to an embodiment of the present invention. In addition, FIG. 5 is an example of the circuit configuration of the optical element driving circuit portion 60, and the circuit configuration of the optical element driving circuit portion 60 is not limited thereto. Further, components that would be understandable to a person skilled in the art may be omitted in FIG. 5.

As shown in FIG. 5, the optical element driving circuit portion 60 includes the push switch 61, a resistive voltage divider circuit 66, a first transistor Tr1, a second transistor Tr2, a third transistor Tr3, and an oscillator OSC. A potential is supplied to the optical element driving circuit portion 60 from the battery 40. Although the potential output from the battery 40 is, for example, 15 V, the potential is not limited thereto. Hereinafter, it is described that the output potential of the battery 40 is 15 V, for convenience.

The resistive voltage divider circuit 66 is electrically connected to the battery 40. Further, the resistive voltage divider circuit 66 is electrically connected to the push switch 61. The resistive voltage divider circuit 66 divides the potential of 15 V supplied from the battery 40 in stages to generate a plurality of potentials. The push switch 61 selects and outputs one of the plurality of potentials generated by the resistive voltage divider circuit 66. Here, the circuit configurations of the push switch 61 and the resistive voltage divider circuit 66 are described with reference to FIG. 6.

Figure 6:
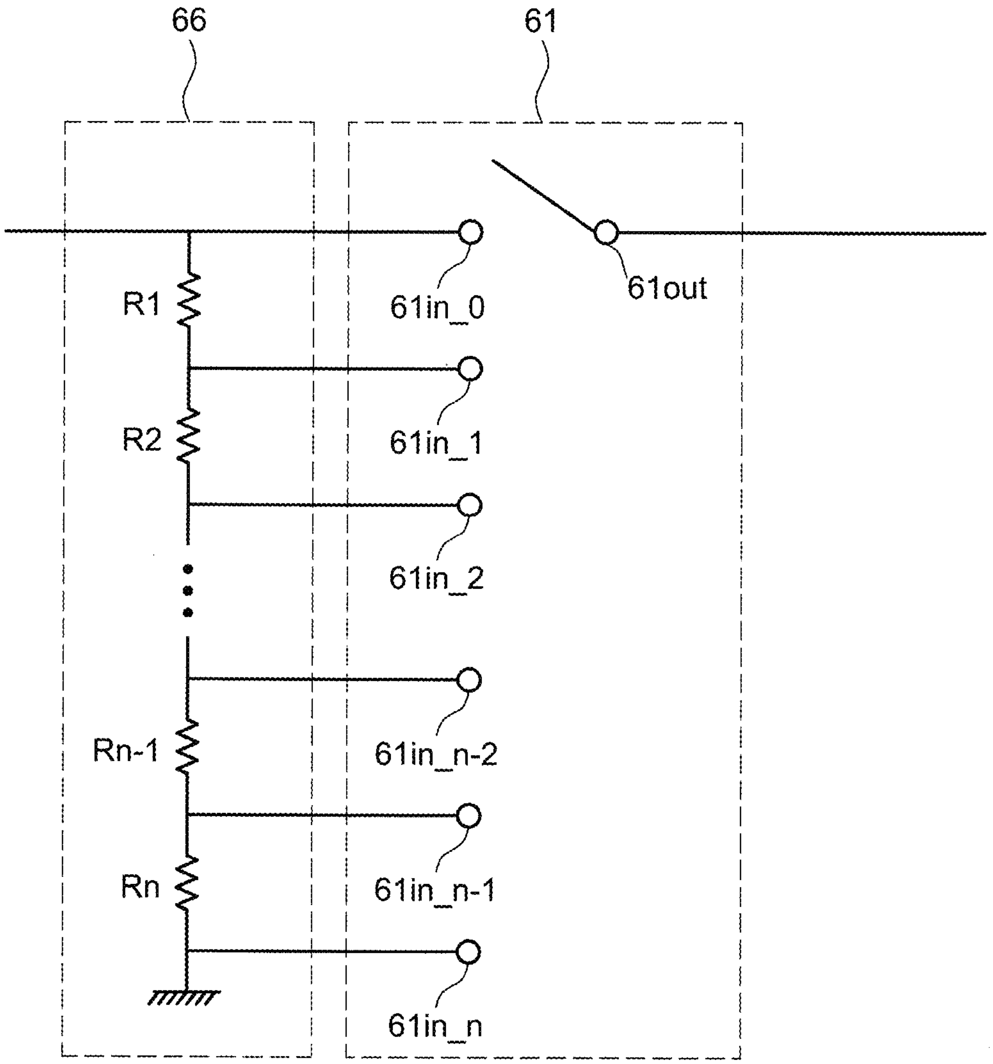
FIG. 6 is a circuit diagram showing circuit configurations of a push switch and a resistive voltage divider circuit in an optical element driving circuit portion of a lighting device according to an embodiment of the present invention.

FIG. 6 is a circuit diagram showing the circuit configurations of the push switch 61 and the resistive voltage divider circuit 66 in the optical element driving circuit section 60 of the lighting device 1 according to an embodiment of the present invention.

The resistive voltage divider circuit 66 includes a plurality of resistors R1, R2, . . . , Rn−1, Rn (n is a natural number). The push switch 61 includes a plurality of input contacts 61in _0, 61in _1, 61in _2, . . . , 61in _n−2, 61in _n−1, 61in _n, and an output contact 61out. The resistive voltage divider circuit 66 divides a potential of 15 V according to the number of resistors R1, R2, . . . , Rn−1, Rn, to generate a plurality of potentials in the range of 0 to 15 V. The generated potentials are input to the plurality of input contacts 61in _0, 61in _1, 61in _2, . . . , 61in _n−2, 61in _n−1, 61in _n, respectively. Specifically, the input contact 61in _0 is electrically connected to the battery 40 without passing through the plurality of resistors R1, R2, . . . , Rn−1, Rn, and 15 V is input to the input contact 61in _0. The input contact 61in _n is electrically connected to GND (0 V), and 0 V is input to input contact 61in _n. A potential corresponding to the division ratio of the plurality of resistors R1, R2, . . . , Rn−1, Rn is input to each of the input contacts 61in _1, 61in _2, . . . , 61in _n−2, 61in _n−1. That is, potentials of different magnitudes are input to each of the plurality of input contacts 61in _0, 61in _1, 61in _2, . . . , 61in _n−2, 61in _n−1, 61in _n.

The potentials generated by the resistive voltage divider circuit 66 are a stepped (discontinuous) potential in the range of 0 to 15 V. Although the potentials input to the plurality of input contacts 61in _0, 61in _1, 61in _2, . . . , 61in _n−2, 61in _n−1, 61in _n decrease from 15 V to 0 V in this order, the intervals between the potentials input to two adjacent input contacts may be the same or different.

In the push switch 61, when the push button is pressed, one of the plurality of input contacts 61in _0, 61 in _1, 61in _2, . . . , 61in _n−2, 61in _n−1, 61in _n is selected, and one of the plurality of input contacts 61in _0, 61in _1, 61in _2, . . . , 61in _n−2, 61in _n−1, 61in _n is electrically connected to the output contact 61out. In the push switch 61, each time the push button is pressed, the electrical connection between the input contacts 61in _0, 61in _1, 61in _2, . . . , 61in _n−2, 61in _n−1, 61in _n and the output contact 61out may be switched in this order, or the electrical connection between the input contacts 61in _n, 61in _n−1, 61in _n−2, . . . , 61in _2, 61in _1, 61in _0 and the output contact 61out may be switched in this order. Further, after the electrical connection with the output contact 61out is switched in the order of input contacts 61in _0, 61in _1, 61in _2, . . . , 61in _n−2, 61in _n−1, 61in _n, the electrical connection with the output contact 61out may be switched again in the order of input contacts 61in _0, 61in _1, 61in _2, . . . , 61in _n−2, 61in _n−1, 61in _n, or the electrical connection with the output contact 61out may be switched again in the order of input contacts 61in _n−1, 61in _n−2, . . . , 61in _2, 61in _1, 61in _0, or the electrical connection with the output contact 61out may be switched again in the order of input contacts 61in _n−1, 61in _n−2, . . . , 61in _2, 61in _1, 61in _0.

In this way, the resistive voltage divider circuit 66 and the push switch 61 can generate a plurality of potentials in a stepwise manner from an input potential, and select and output one of the generated potentials. Further, the output potential can be controlled by operating the push button of the push switch 61.

Referring again to FIG. 5, the optical element driving circuit portion 60 will be described.

The optical element driving circuit portion 60 includes a first output terminal 67_1, a second output terminal 67_2, a third output terminal 67_3, a fourth output terminal 67_4, and a fifth output terminal 67_5. The optical element driving circuit portion 60 generates signals for driving the optical element 10, and outputs a first signal S1, a second signal S2, a third signal S3, a fourth signal S4, and a fifth signal S5 from the first output terminal 67_1, the second output terminal 67_2, the third output terminal 67_3, the fourth output terminal 67_4, and the fifth output terminal 67_5, respectively.

The oscillator OSC is electrically connected to the gate of the first transistor Tr1 and the gate of the second transistor Tr2. The oscillator OSC generates and outputs a rectangular wave. Although the frequency of the rectangular wave is, for example, 60 Hz, the frequency is not limited thereto. The rectangular wave output from the oscillator OSC is input to the gate of the first transistor Tr1 and the gate of the second transistor Tr2. Therefore, each of the first transistor Tr1 and the second transistor Tr2 alternates between an on-state and an off-state depending on the frequency of the rectangular wave.

One of the source and drain of the first transistor Tr1 is electrically connected to the output contact of the push switch 61 via a contact C1. The contact C1 is electrically connected to the first output terminal 67_1 via a node N1. The other of the source and drain of the first transistor Tr1 is electrically connected to GND (0 V). Therefore, when the first transistor Tr1 is in an ON state, the potential of the node N1 is 0 V. On the other hand, when the first transistor Tr1 is in an OFF state, the potential of the node N1 is a predetermined potential selected by operating the push button of the push switch 61. That is, the first signal S1 having a first pulse wave PW1 with an amplitude equal to a predetermined potential is output from the first output terminal 67_1 electrically connected to the node N1. The first pulse wave PW1 has a phase that is the inverted phase of the rectangular wave generated by the oscillator OSC.

One of the source and drain of the second transistor Tr2 is electrically connected to the battery 40 via a contact C2. The contact C2 is electrically connected to the gate of the third transistor Tr3 via a node N2. The other of the source and drain of the second transistor Tr2 is electrically connected to GND (O V). Therefore, when the second transistor Tr2 is in an ON state, the potential of the node N2 is 0 V. On the other hand, when the second transistor Tr2 is in an OFF state, the potential of the node N2 is 15 V. That is, the potential of the node N2 alternates between 0 V and 15 V depending on the frequency of the rectangular wave.

The gate of the third transistor Tr3 is electrically connected to the node N2. One of the source and drain of the third transistor Tr3 is electrically connected to the output contact 61out of the push switch 61 via a contact C3. The contact C3 is electrically connected to the second output terminal 67_2 via a node N3. The other of the source and drain of the third transistor Tr3 is electrically connected to GND (0 V). Therefore, when the third transistor Tr3 is in the ON state, the potential of the node N3 is 0 V. On the other hand, when the third transistor Tr3 is in the OFF state, the potential of the node N3 is a predetermined potential selected by operating the push button of the push switch 61. That is, the second signal S2 having a second pulse wave PW2 with an amplitude equal to a predetermined potential is output from the second output terminal 67_2 electrically connected to the node N3. The second pulse wave PW2 has the same phase as the rectangular wave generated by the oscillator OSC.

The third output terminal 67_3 to the fifth output terminal 67_5 are electrically connected to the output contact 61out of the push switch 61. Therefore, the third signal S3 to the fifth signal S5 output from the third output terminal 67_3 to the fifth output terminal 67_5 have a fixed potential P fix corresponding to a predetermined potential. In addition, although not shown in the figures, a resistive voltage divider circuit may be electrically connected to the fifth output terminal 67_5, and the fifth output terminal 67_5 may output a fifth signal S5 having a fixed potential (e.g., an intermediate potential of a predetermined potential) generated by the resistive voltage divider circuit.

The first signal S1 to the fourth signal S4 generated by the optical element driving circuit portion 60 are input to the optical element 10. Here, the signals input to the optical element 10 and the driving of the optical element 10 in the lighting device 1 are described with reference to FIG. 7.

Figure 7:
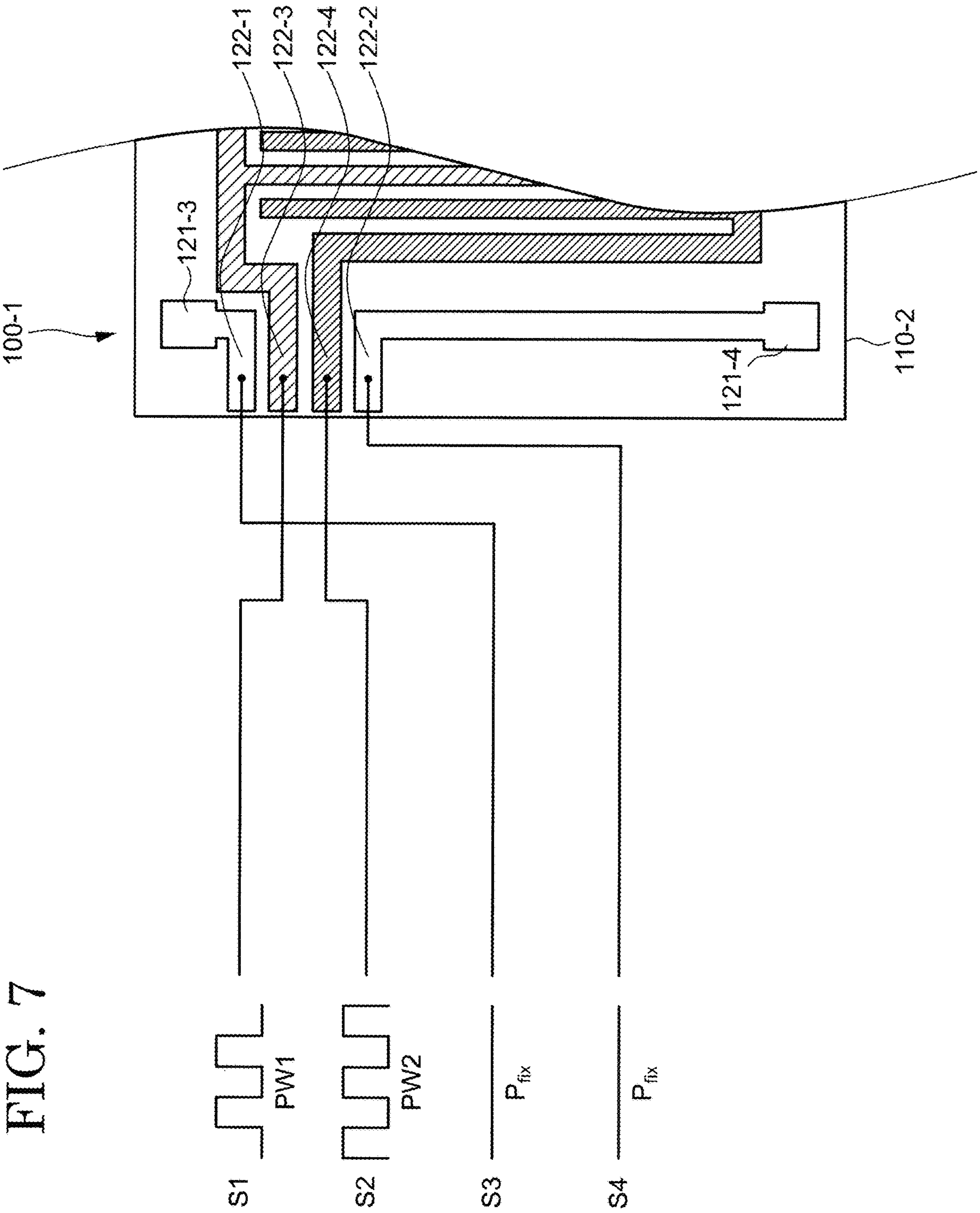
FIG. 7 is a schematic diagram showing signals input to an optical element of a lighting device according to an embodiment of the present invention.

FIG. 7 is a schematic diagram showing signals input to the optical element 10 of the lighting device 1 according to an embodiment of the present invention. FIG. 7 shows the first liquid crystal cell 100-1 of the optical element 10.

The first signal S1 to the fourth signal S4 are input to the first terminal 122-1 to the fourth terminal 122-4, respectively. The first terminal 122-1 to the fourth terminal 122-4 are electrically connected to the first transparent electrode 120-1 to the fourth transparent electrode 120-4, respectively. Therefore, the first pulse wave PW1 is applied to the first transparent electrode 120-1, the second pulse wave PW2 is applied to the second transparent electrode 120-2, and the fixed potential $P_{fix}$ is applied to the third transparent electrode 120-3 and the fourth transparent electrode 120-4.

The first pulse wave PW1 and the second pulse wave PW2 have the same amplitude but opposite phases. Therefore, a lateral electric field is generated between the first transparent electrode 120-1 and the second transparent electrode 120-2, and the alignment state of the liquid crystal molecules on the first substrate 110-1 side changes. Since the same fixed potential $P_{fix}$ is applied to the third signal S3 and the fourth signal S4, a lateral electric field is not generated between the third transparent electrode 120-3 and the fourth transparent electrode 120-4, and the alignment state of the liquid crystal molecules on the second substrate 110-2 side does not change. In this case, light passing through the first liquid crystal cell 100-1 is diffused in the y-axis direction. Although the diffusion angle in the y-axis direction varies depending on the amplitude of the first pulse wave PW1 and the second pulse wave PW2, the diffusion angle in the y-axis direction can be easily adjusted by operating the push button of the push switch 61.

Although detailed description is omitted, signals are also input to the second liquid crystal cell 100-2 to the fourth liquid crystal cell 100-4 as appropriate so that the transmitted light is diffused in the y-axis direction. Therefore, the light irradiated from the lighting device 1 has a linear light distribution shape that is elongated in the y-axis direction.

As described above, the lighting device 1 according to the present embodiment can irradiate light having a linear light distribution shape that is elongated in one axis direction (e.g., y-axis direction). The light distribution angle of the light irradiated from the lighting device 1 can be controlled in a stepwise manner by operating the push button of the push switch 61. That is, when a user presses the push button of the push switch 61, the output from the output contact 61out can be changed in a stepwise manner. Thus, the amplitude of the first pulse wave PW1 and the second pulse wave PW2 can be changed in a stepwise manner. Since the amplitude of each pulse wave corresponds to the potential difference between the transparent electrodes 120 of each liquid crystal cell 100 of the optical element 10, the larger the amplitude of the pulse wave, the larger the potential difference between the transparent electrodes. In this case, the refractive index distribution of the liquid crystal molecules becomes larger, and the light distribution angle becomes larger. Further, the smaller the amplitude of the pulse wave, the smaller the potential difference between the transparent electrodes. In this case, the refractive index distribution of the liquid crystal molecules becomes smaller, and the light distribution angle also becomes smaller. In this way, the light distribution angle of the light irradiated from the lighting device 1 can be easily adjusted by simply pressing the push switch 61. In addition, the magnitude of the fixed potential $P_{fix}$ can also be changed by pressing the push switch 61.

Various modifications are possible to the lighting device 1. In the following description, some modifications of the optical element drive circuit portion 60 of the lighting device 1 are described. In addition, hereinafter, descriptions of configurations that are similar to the configuration of the optical element drive circuit portion 60 may be omitted.

Modification 1

An optical element driving circuit portion 60A, which is one modification of the optical element driving circuit portion 60, is described with reference to FIG. 8.

Figure 8:
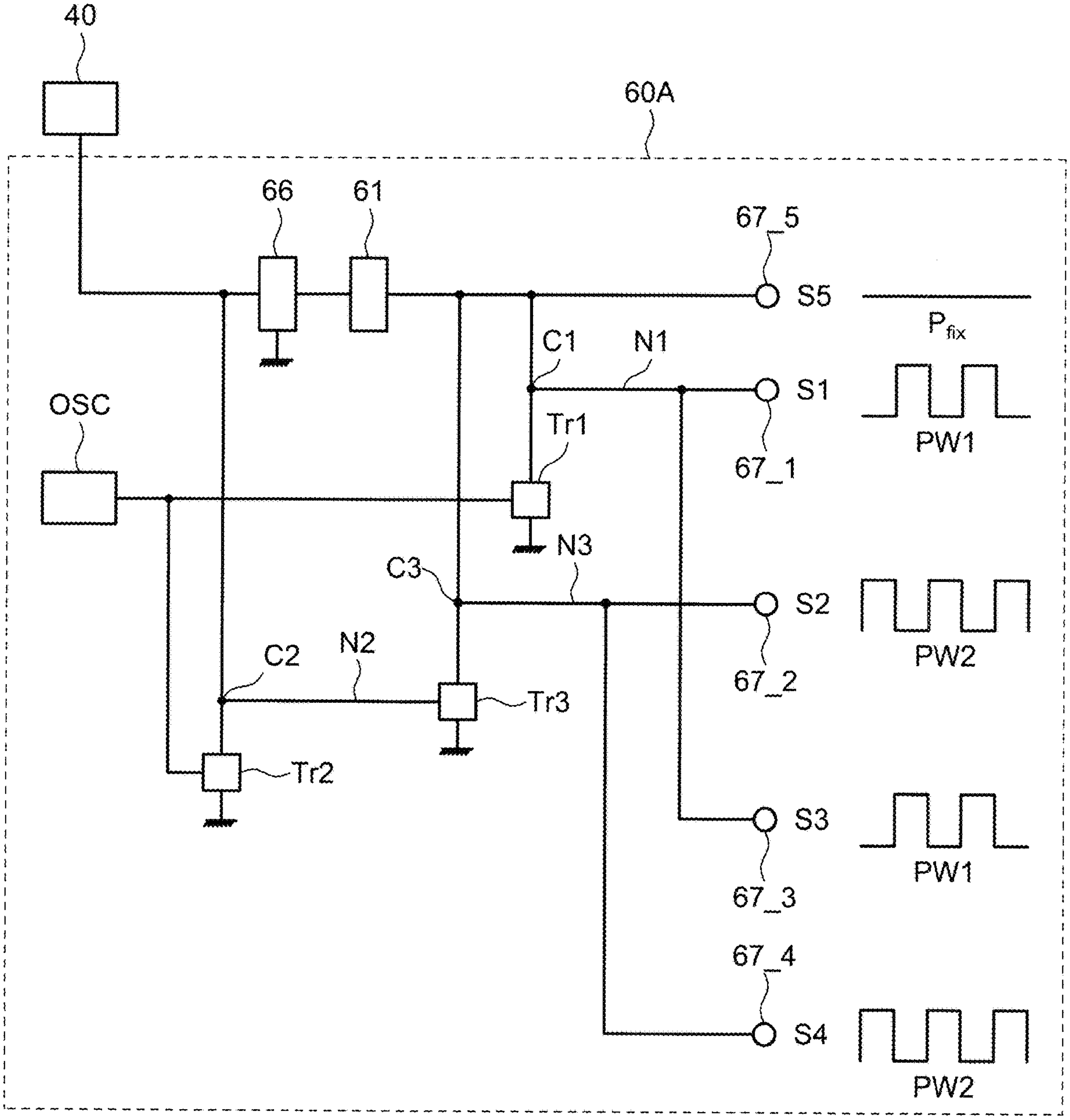
FIG. 8 is a block diagram showing a circuit configuration of an optical element driving circuit portion of a lighting device according to an embodiment of the present invention.

FIG. 8 is a block diagram showing a circuit configuration of the optical element driving circuit portion 60A of the lighting device 1 according to an embodiment of the present invention.

The first output terminal 67_1 and the third output terminal 67_3 are electrically connected to the node N1. Therefore, the first signal S1 output from the first output terminal 67_1 and the third signal S3 output from the third output terminal 67_3 each have the first pulse wave PW1. The second output terminal 67_2 and the fourth output terminal 67_4 are electrically connected to the node N3. Therefore, the second signal S2 output from the second output terminal 67_2 and the fourth signal S4 output from the fourth output terminal 67_4 each have the second pulse wave PW2. The fifth output terminal 67_5 is electrically connected to the output contact 61out of the push switch 61. Therefore, the fifth signal S5 output from the fifth output terminal 67_5 has the fixed potential $P_{fix}$ corresponding to a predetermined potential.

The first signal S1 to the fourth signal S4 are input to the first terminal 122-1 to the fourth terminal 122-4, respectively. The first terminal 122-1 to the fourth terminal 122-4 are electrically connected to the first transparent electrode 120-1 to the fourth transparent electrode 120-4, respectively. Therefore, the first pulse wave PW1 is applied to the first transparent electrode 120-1 and the third transparent electrode 120-3, and the second pulse wave PW2 is applied to the second transparent electrode 120-2 and the fourth transparent electrode 120-4.

The first pulse wave PW1 and the second pulse wave PW2 have the same amplitude but opposite phases. Therefore, a lateral electric field is generated between the first transparent electrode 120-1 and the second transparent electrode 120-2, and the alignment state of the liquid crystal molecules on the first substrate 110-1 side changes. Further, a lateral electric field is generated between the third transparent electrode 120-3 and the fourth transparent electrode 120-4, and the alignment state of the liquid crystal molecules on the second substrate 110-2 side changes. In this case, light passing through the first liquid crystal cell 100-1 is diffused in the x-axis direction and the y-axis direction. Therefore, the light irradiated from the lighting device 1 according to the present modification has a circular light distribution shape that is diffused in the x-axis direction and the y-axis direction.

As described above, the lighting device 1 according to the present modification can irradiate light having a circular light distribution shape. The light distribution angle of the light irradiated from the lighting device 1 is controlled in a stepwise manner by operating the push button of the push switch 61. In other words, when a user presses the push button of the push switch 61, the light distribution angle of the light emitted from the lighting device 1 can easily be adjusted.

Modification 2

An optical element driving circuit portion 60B, which is the other modification of the optical element driving circuit portion 60, is described with reference to FIG. 9.

Figure 9:
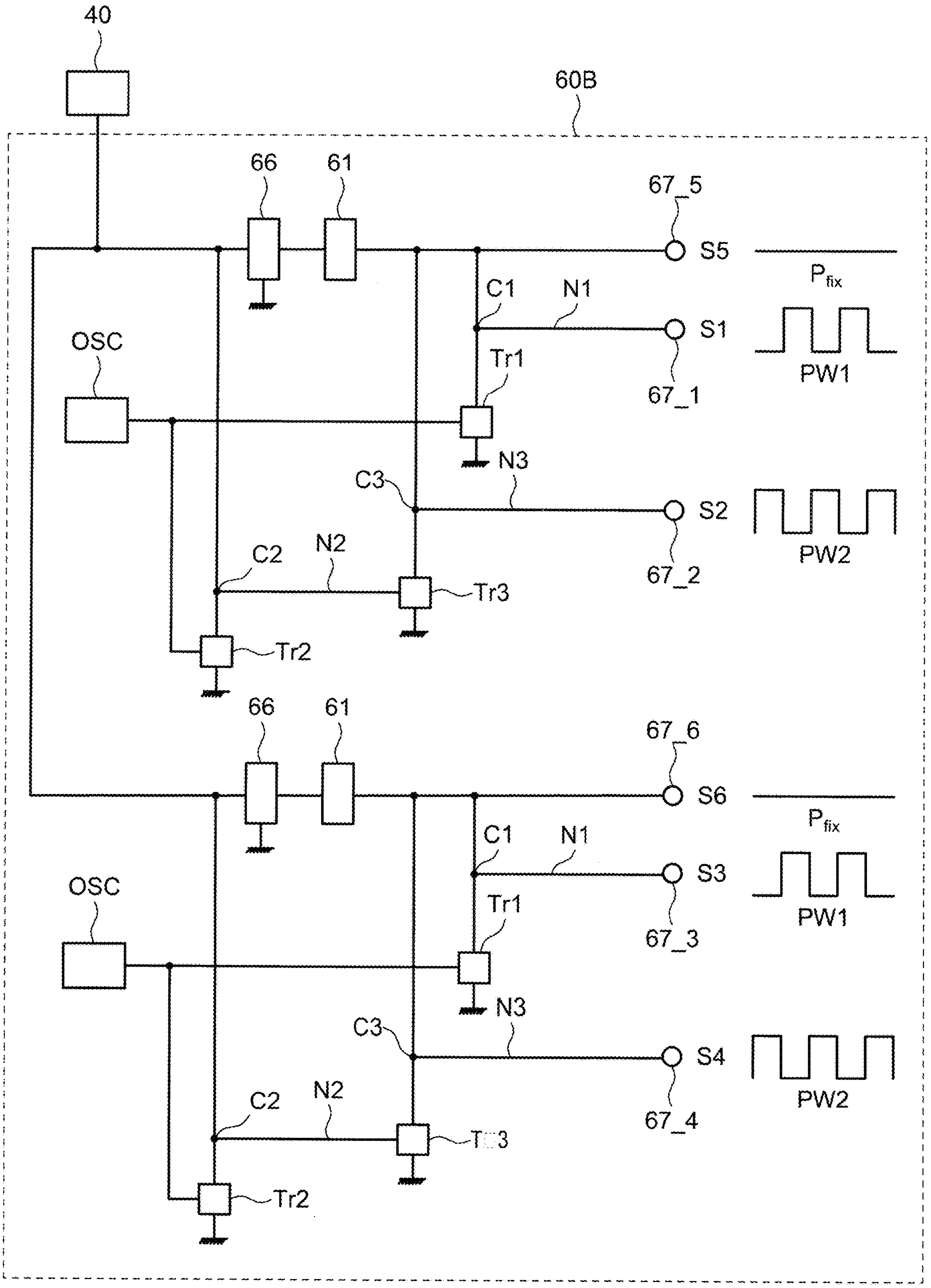
FIG. 9 is a block diagram showing a circuit configuration of an optical element driving circuit portion of a lighting device according to an embodiment of the present invention.

FIG. 9 is a block diagram showing a circuit configuration of the optical element driving circuit portion 60B of the lighting device 1 according to an embodiment of the present invention.

The optical element driving circuit portion 60B includes a first output terminal 67_1, a second output terminal 67_2, a third output terminal 67_3, a fourth output terminal 67_4, a fifth output terminal 67_5, and a sixth output terminal 67_6. The optical element driving circuit portion 60B generates signals for driving the optical element 10, and outputs a first signal S1, a second signal S2, a third signal S3, a fourth signal S4, a fifth signal S5, and a sixth signal S6 from the first output terminal 67_1, the second output terminal 67_2, the third output terminal 67_3, the fourth output terminal 67_4, the fifth output terminal 67_5, and the sixth output terminal 67_6, respectively.

The optical element driving circuit portion 60B includes two push switches 61 and two resistive voltage divider circuits 66. In the optical element driving circuit portion 60B, the resistive voltage divider circuits 66 and the push switches 61 are used not only to generate the first signal S1 and the second signal S2, but also to generate the third signal S3 and the fourth signal S4. Specifically, a circuit connected to one of the two push switches 61 includes the first output terminal 67_1, the second output terminal 67_2, and the fifth output terminal 67_5, and the first signal S1, the second signal S2, and the fifth signal S5 are output from the first output terminal 67_1, the second output terminal 67_2, and the fifth output terminal 67_5, respectively. Further, the circuit connected to the other of the two push switches 61 includes the third output terminal 67_3, the fourth output terminal 67_4, and the sixth output terminal 67_6, and the third signal S3, the fourth signal S4, and the sixth signal S6 are output from the third output terminal 67_3, the fourth output terminal 67_4, and the sixth output terminal 67_6, respectively.

In the optical element driving circuit portion 60B, the first signal S1 and the third signal S3 each have a first pulse wave PW1, the second signal S2 and the fourth signal S4 each have a second pulse wave PW2, and the fifth signal S5 and the sixth signal S6 each have a fixed potential $P_{fix}$ corresponding to a predetermined potential.

The first signal S1 to the fourth signal S4 are input to the first terminal 122-1 to the fourth terminal 122-4, respectively. The first terminal 122-1 to the fourth terminal 122-1 are electrically connected to the first transparent electrode 120-1 to the fourth transparent electrode 120-4, respectively. Therefore, the first pulse wave PW1 is applied to the first transparent electrode 120-1 and the third transparent electrode 120-3, and the second pulse wave PW2 is applied to the second transparent electrode 120-2 and the fourth transparent electrode 120-4.

The first pulse wave PW1 and the second pulse wave PW2 have the same amplitude but opposite phases. Therefore, a lateral electric field is generated between the first transparent electrode 120-1 and the second transparent electrode 120-2, and the alignment state of the liquid crystal molecules on the first substrate 110-1 side changes. Further, a lateral electric field is generated between the third transparent electrode 120-3 and the fourth transparent electrode 120-4, and the alignment state of the liquid crystal molecules on the second substrate 110-2 side changes. In this case, light passing through the first liquid crystal cell 100-1 is diffused in the x-axis direction and the y-axis direction. Therefore, the light irradiated from the lighting device 1 according to the present modification has a circular light distribution shape that is diffused in the x-axis direction and the y-axis direction.

As described above, the lighting device 1 according to the present modification can irradiate light having a circular light distribution shape. The light distribution angle of the light irradiated from the lighting device 1 is controlled in a stepwise manner by operating the push button of the push switch 61. That is, when a user presses the push button of the push switch 61, the light distribution angle of the light irradiated from the lighting device 1 can be easily adjusted. Further, in the lighting device 1 according to the present modification, the push switches 61 control the amplitudes of the first pulse waves PW1 and the second pulse waves PW2 of the first signal S1 and the second signal S2, and the amplitudes of the first pulse waves PW1 and the second pulse waves PW2 of the third signal S3 and the fourth signal S4. Therefore, in the lighting device 1 according to the present modification, the light distribution angles in the x-axis direction and the y-axis direction can be adjusted independently. As a result, not only a circular light distribution shape but also an elliptical light distribution shape can be formed.

Second Embodiment

A lighting device 2 according to an embodiment of the present invention is described with reference to FIGS. 10 and 11. In addition, hereinafter, description of the configuration similar to the configuration of the lighting device 1 may be omitted.

Figure 10:
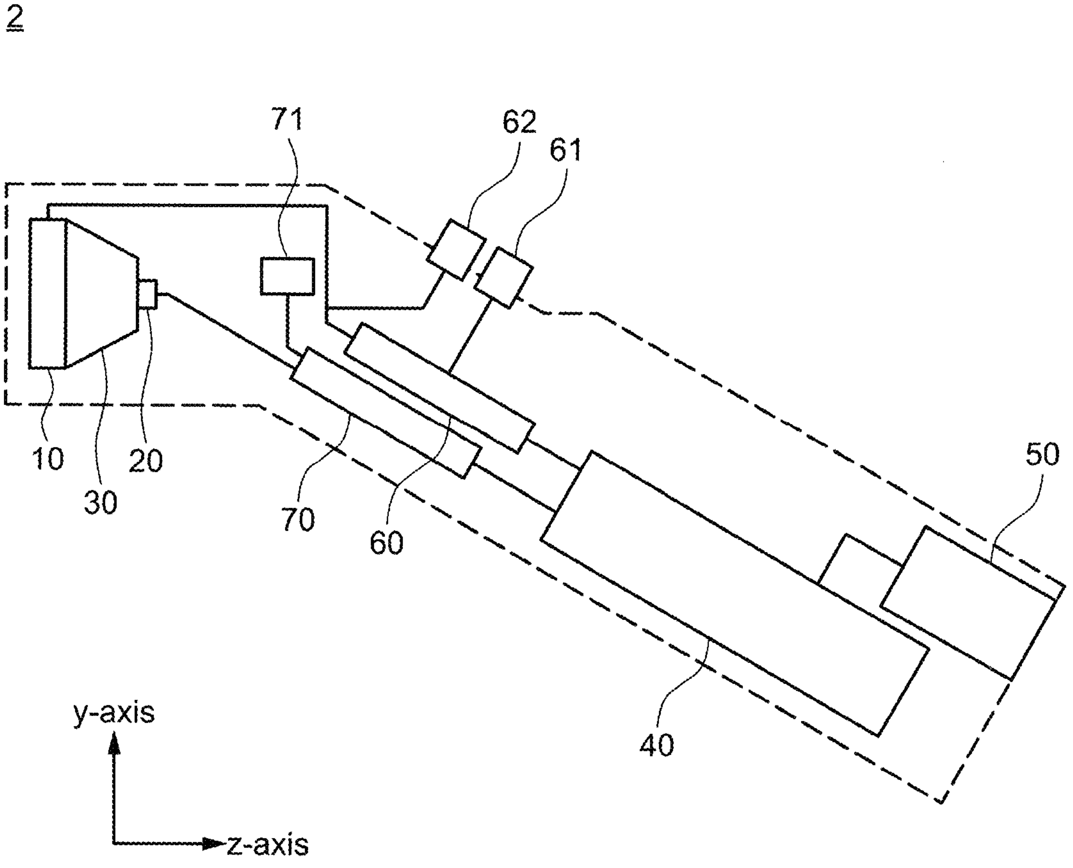
FIG. 10 is a schematic block diagram showing an internal configuration of a lighting device according to an embodiment of the present invention.

FIG. 10 is a schematic block diagram showing an internal configuration of the lighting device 2 according to an embodiment of the present invention.

As shown in FIG. 10, the lighting device 2 includes the optical element 10, the light source 20, the optical adjustment portion 30, the battery 40, the charging module 50, an optical element driving circuit portion 60, and the light source driving circuit portion 70. The optical element driving circuit portion 60 of the lighting device 2 is connected to not only the push switch 61 but also a push switch 62. Specifically, the push switch 62 is disposed between the optical element driving circuit portion 60 and the optical element 10. In other words, the optical element 10 is electrically connected to the optical element driving circuit portion 60 via the push switch 62. The push button of the push switch 62, which is similar to the push button of the push switch 61, is provided on the top surface of the body unit 1*a*. For example, the push button of the push switch 62 is disposed side by side with the push button of the push switch 61 in the z-axis direction or the x-axis direction on the top surface of the body unit 1*a*. However, the position of the push button of the push switch 62 is not limited thereto. The push button of the push switch 62 may also be provided on the side surface of the body unit 1*a*.

The push switch 62 controls the light distribution shape of the light irradiated from the lighting unit 1*b*. That is, when a user presses the push button of the push switch 62, the light distribution shape of the light irradiated from the lighting unit 1*b* changes. In other words, the push switch 62 controls the signal input to the optical element 10, thereby switching the light distribution shape. Hereinafter, the signal input to the optical element 10 and the driving of the optical element 10 in the lighting device 2 are described with reference to FIG. 11.

Figure 11:
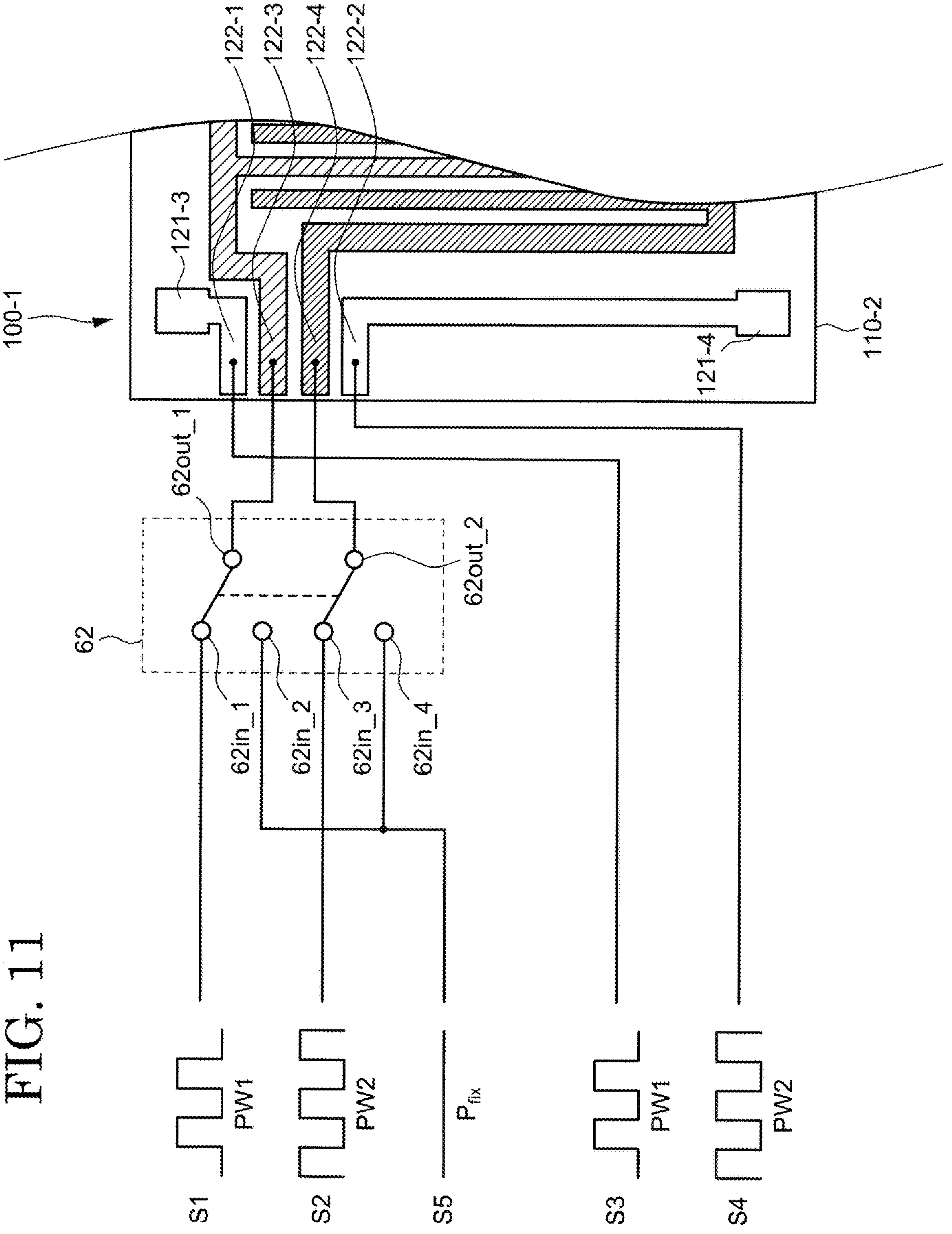
FIG. 11 is a schematic diagram showing signals input to an optical element of a lighting device according to an embodiment of the present invention.

FIG. 11 is a schematic diagram showing signals input to the optical element 10 of the lighting device 2 according to an embodiment of the present invention. FIG. 11 shows the first liquid crystal cell 100-1 of the optical element 10.

The push switch 62 includes a plurality of input contacts 62in _1, 62in _2, 62in _3, and 62in _4, and a plurality of output contacts 62out_1 and 62out_2. In the push switch 62, the output contact 62out_1 is electrically connected to one of the input contacts 62in _1 and 62in _2, and the output contact 62out_2 is electrically connected to one of the input contacts 62in _3 and 62in _4. The electrical connections of the output contacts 62out_1 and 62out_2 in the push switch 62 are interlocked. When the output contact 62out_1 is electrically connected to the input contact 62in _1, the output contact 62out_2 is electrically connected to the input contact 62in _3. On the other hand, when the output contact 62out_1 is electrically connected to the input contact 62in _2, the output contact 62out_2 is electrically connected to the input contact 62in _4. Every time the push button of the push switch 62 is pressed, the electrical connection between the output contacts 62out_1 and 62out_2 is switched.

As shown in FIG. 11, the first signal S1 and the second signal S2 are input to the input contacts 62in _1 and 62in _3, respectively, and the fifth signal S1 is input to the input contacts 62in _2 and 62in _4.

When the output contacts 62out_1 and 62out_2 are electrically connected to the input contacts 62in _1 and 62in _3, respectively, the first signal S1 and the second signal S2 are input to the first terminal 122-1 and the second terminal 122-2, respectively. Further, the third signal S3 and the fourth signal S4 are input to the third terminal 122-3 and the fourth terminal 122-4, respectively. Therefore, the first pulse wave PW1 is applied to the first transparent electrode 120-1 and the third transparent electrode 120-3, and the second pulse wave PW2 is applied to the second transparent electrode 120-2 and the fourth transparent electrode 120-4.

In this case, a lateral electric field is generated between the first transparent electrode 120-1 and the second transparent electrode 120-2, and the alignment state of the liquid crystal molecules on the first substrate 110-1 side changes. Further, a lateral electric field is generated between the third transparent electrode 120-3 and the fourth transparent electrode 120-4, and the alignment state of the liquid crystal molecules on the second substrate 110-2 side changes. Therefore, light passing through the first liquid crystal cell 100-1 is diffused in the x-axis direction and the y-axis direction. Therefore, the light irradiated from the lighting device 2 has a circular light distribution shape that is diffused in the x-axis direction and the y-axis direction.

When the output contacts 62out_1 and 62out_2 are electrically connected to the input contacts 62in _2 and 62in _4, respectively, the fifth signal S5 is input to the first terminal 122-1 and the second terminal 122-2. Further, the third signal S3 and the fourth signal S4 are input to the third terminal 122-3 and the fourth terminal 122-4, respectively. Therefore, the fixed potential $P_{fix}$ is applied to the first transparent electrode 120-1 and the second transparent electrode 120-2, the first pulse wave PW1 is applied to the third transparent electrode 120-3, and the second pulse wave PW2 is applied to the fourth transparent electrode 120-4.

In this case, a lateral electric field is not generated between the first transparent electrode 120-1 and the second transparent electrode 120-2, and the alignment state of the liquid crystal molecules on the first substrate 110-1 side does not change. On the other hand, a lateral electric field is generated between the third transparent electrode 120-3 and the fourth transparent electrode 120-4, and the alignment state of the liquid crystal molecules on the second substrate 110-2 side changes. Therefore, light passing through the first liquid crystal cell 100-1 is diffused in the x-axis direction.

Therefore, the light irradiated from the lighting device 2 has a linear light distribution shape that is elongated in the x-axis direction.

The above description illustrates a configuration in which the push switch 62 is connected to the first liquid crystal cell 100-1, for convenience. However, it is preferable that the push switch 62 is also connected to the second liquid crystal cell 100-2 to the fourth liquid crystal cell 100-4. In this case, each of the four push switches 62 may be connected to the first liquid crystal cell 100-1 to fourth liquid crystal cell 100-4, and each of the plurality of contacts of one switch may be electrically connected to the first terminal 122-1 to the fourth terminal 122-4 of each of the first liquid crystal cell 100-1 to the fourth liquid crystal cell 100-4. Although details are omitted, the connection between the terminals of each liquid crystal cell 100 (the first terminal 122-1 to the fourth terminal 122-4) and the push switch 62 may vary depending on the light distribution shape. In the lighting device 2, various light distribution shapes can be formed using the push switches 62.

As described above, in the lighting device 2 according to the present embodiment, the light distribution shape can be switched between circular and linear and the light can be irradiated by operating the push button of the push switch 62. Further, the light distribution angle of the light irradiated from the lighting device 2 is controlled in a stepwise manner by operating the push button of the push switch 61. In other words, when a user presses the push buttons of the push switches 62 and 61, the light distribution shape and the light distribution angle of the light irradiated from the lighting device 2 can be easily adjusted.

The embodiments, including the modifications, can be combined with each other as long as no technical contradiction occurs.

Within the scope of the present invention, those skilled in the art may conceive of examples of changes and modifications, and it is understood that these examples of changes and modifications are also included within the scope of the present invention. For example, additions, deletions, or design changes of constituent elements, or additions, omissions, or changes to conditions of steps as appropriate based on the respective embodiments described above are also included within the scope of the present invention as long as the gist of the present invention is provided.

Further, other effects which differ from those brought about by each embodiment, but which are apparent from the description herein or which can be readily predicted by those skilled in the art, are naturally understood to be brought about by the present invention.

What is claimed is:

1. A lighting device, comprising:

a light source;

an optical element comprising a first liquid crystal cell and transmitting light emitted from the light source in a diffusible manner;

an optical element driving circuit portion connected to the optical element and generating a signal for driving the optical element; and a first push switch comprising a push button operated by a user and connected to the optical element driving circuit portion, wherein the first liquid crystal cell comprises:

a first substrate on which a first transparent electrode and a second transparent electrode each extending in a first direction are alternatively arranged in a second direction orthogonal to the first direction, a second substrate on which a third transparent electrode and a fourth transparent electrode each extending in the second direction are alternately arranged in the first direction, and a liquid crystal layer between the first substrate and the second substrate, wherein the optical element driving circuit portion comprises:

a first resistive voltage divider circuit electrically connected to a plurality of input contacts of the first push switch, a first output terminal electrically connected to an output contact of the first push switch and outputting a first signal having a first pulse wave, and a second output terminal electrically connected the output contact of the first push switch and outputting a second signal having a second pulse wave with an inverted phase of the first pulse wave, wherein the first signal is input to the optical element so that the first pulse wave is applied to the first transparent electrode, wherein the second signal is input to the optical element so that the second pulse wave is applied to the second transparent electrode, and wherein each time the push button of the first push switch is pressed, one of the plurality of input contacts is selected so as to be electrically connected to the output contact, and an amplitude of each of the first pulse wave and the second pulse wave is changed in a stepwise manner.

2. The lighting device according to claim 1, wherein the optical element driving circuit portion further comprises:

a third output terminal electrically connected to the output contact of the first push switch and outputting a third signal having a fixed potential, and a fourth output terminal electrically connected to the output contact of the first push switch and outputting a fourth signal having the fixed potential, wherein the third signal is input to the optical element so that the fixed potential is applied to the third transparent electrode, and wherein the fourth signal is input to the optical element so that the fixed potential is applied to the fourth transparent electrode.

3. The lighting device according to claim 1, wherein the optical element driving circuit portion further comprises:

a third output terminal electrically connected to the output contact of the first push switch and outputting a third signal having the first pulse wave, and a fourth output terminal electrically connected to the output contact of the first push switch and outputting a fourth signal having the second pulse wave, wherein the third signal is input to the optical element so that the first pulse wave is applied to the third transparent electrode, and wherein the fourth signal is input to the optical element so that the second pulse wave is applied to the fourth transparent electrode.

4. The lighting device according to claim 1, further comprising a second push switch comprising a push button operated by the user and connected to the optical element driving circuit portion, wherein the optical element driving circuit portion further comprises:

a second resistive voltage divider circuit electrically connected to a plurality of input contacts of the second push switch, a third output terminal electrically connected to an output contact of the second push switch and outputting a third signal having a third pulse wave, and a fourth output terminal electrically connected to the output contact of the second push switch and outputting a fourth signal having a fourth pulse wave with an inverted phase of the third wave, wherein the third signal is input to the optical element so that the third pulse wave is applied to the third transparent electrode, wherein the fourth signal is input to the optical element so that the fourth pulse wave is applied to the fourth transparent electrode, and wherein each time the push button of the second push switch is pressed, one of the plurality of input contacts is selected so as to be electrically connected to the output contact, and an amplitude of each of the third pulse wave and the fourth pulse wave is changed in a stepwise manner.

5. The lighting device according to claim 1, further comprising a light source adjustment switch that is operated to adjust a brightness of the light source.

6. The lighting device according to claim 5, wherein a light source adjustment switch is a slide switch that can continuously adjust the brightness of the light source.

7. The lighting device according to claim 5, wherein a light source adjustment switch is a push switch that can adjust the brightness of the light source in a stepwise manner.

8. A lighting device, comprising:

a light source;

an optical element comprising a first liquid crystal cell and transmitting light emitted from the light source in a diffusible manner;

an optical element driving circuit portion connected to the optical element and generating a signal for driving the optical element;

a first push switch comprising a first push button operated by a user and connected to the optical element driving circuit portion; and a second push switch comprising a second push button operated by the user, wherein a first input contact, a second input contact, a third input contact, and a fourth input contact of the second push switch are electrically connected to the optical element driving circuit portion, wherein a first output contact and a second output contact of the second push switch are electrically connected to the optical element, wherein the first liquid crystal cell comprises:

a first substrate on which a first transparent electrode and a second transparent electrode each extending in a first direction are alternatively arranged in a second direction orthogonal to the first direction, a second substrate on which a third transparent electrode and a fourth transparent electrode each extending in the second direction are alternately arranged in the first direction, and a liquid crystal layer between the first substrate and the second substrate, wherein the optical element driving circuit portion generates a first signal having a first pulse wave, a second signal with an inverted phase of the first pulse wave, and a third signal having a fixed potential, wherein the first signal and the second signal are input to the first input contact and the second input contact of the second push switch, respectively, wherein the third signal is input to the third input contact and the fourth input contact of the second push switch, respectively, wherein each time the second push button of the second push switch is pressed, one of the first input contact and the second input contact is selected so as to be electrically connected to the first output contact and one of the third input contact and the fourth input contact is selected so as to be electrically connected to the second output contact, and wherein the first pulse wave and the second pulse wave are applied to the first transparent electrode and the second transparent electrode, respectively, or the fixed potential is applied to the first transparent electrode and the second transparent electrode.

9. The lighting device according to claim 8, wherein each time the first push button of the first push switch is pressed, the optical element driving circuit portion changes an amplitude of each of the first pulse wave and the second pulse wave in a stepwise manner.

10. The lighting device according to claim 8, wherein the optical element driving circuit portion further generates a fourth signal having the first pulse wave and a fifth signal having the second pulse wave, wherein the fourth signal is input to the optical element so that the first pulse wave is applied to the third transparent electrode, and wherein the fifth signal is input to the optical element so that the second pulse wave is applied to the fourth transparent electrode.

11. The lighting device according to claim 8, further comprising a light source adjustment switch that is operated to adjust a brightness of the light source.

12. The lighting device according to claim 11, wherein a light source adjustment switch is a slide switch that can continuously adjust the brightness of the light source.

13. The lighting device according to claim 11, wherein a light source adjustment switch is a push switch that can adjust the brightness of the light source in a stepwise manner.

* * * * *